(12) United States Patent
Zhang et al.

(10) Patent No.: US 11,057,775 B2
(45) Date of Patent: Jul. 6, 2021

(54) KEY CONFIGURATION METHOD, SECURITY POLICY DETERMINING METHOD, AND APPARATUS

(71) Applicant: HUAWEI TECHNOLOGIES CO., LTD., Guangdong (CN)

(72) Inventors: Bo Zhang, Shenzhen (CN); Rong Wu, Shenzhen (CN); Lu Gan, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 224 days.

(21) Appl. No.: 16/224,999

(22) Filed: Dec. 19, 2018

(65) Prior Publication Data
US 2019/0124502 A1   Apr. 25, 2019

Related U.S. Application Data

(63) Continuation of application No. PCT/CN2017/083265, filed on May 5, 2017.

(30) Foreign Application Priority Data

Jul. 1, 2016 (CN) .......................... 201610511486.4
Jul. 25, 2016 (CN) .......................... 201610592312.5
(Continued)

(51) Int. Cl.
*H04W 12/00* (2021.01)
*H04W 12/37* (2021.01)
(Continued)

(52) U.S. Cl.
CPC .............. *H04W 12/37* (2021.01); *H04L 9/08* (2013.01); *H04L 63/0428* (2013.01);
(Continued)

(58) Field of Classification Search
CPC ............. H04W 12/10; H04W 12/0027; H04W 12/04031; H04W 12/37; H04W 12/0431;
(Continued)

(56) References Cited

U.S. PATENT DOCUMENTS 8,898,729 B2    11/2014  Zhang et al.
2008/0307217 A1  12/2008  Yukimatsu et al.
(Continued)

FOREIGN PATENT DOCUMENTS

CN    1773903 A    5/2006
CN    101174946 A   5/2008
(Continued)

OTHER PUBLICATIONS

XP051290424 3GPP TR 33.899 V1.0.0 (Mar. 2017),3rd Generation Partnership Project;Technical Specification Group Services and System Aspects;Study on the security aspects of the next generation systeo (Release 14),total 471 pages.
(Continued)

*Primary Examiner* — Baotran N To
(74) *Attorney, Agent, or Firm* — Gregg L. Jansen

(57) ABSTRACT

This application provides a key configuration method. A session management network element receives a request for end-to-end communication and obtains a security policy, where the security policy is determined based on at least one of: a user security requirement that is of the user equipment and that is preconfigured on a home subscriber server, a service security requirement from the user equipment, a security capability requirement supported by the user equipment, a security capability requirement from a carrier network, and a security requirement of a device on the other end of the end-to-end communication. The session management network element obtains a protection key used for protecting the end-to-end communication. The session management
(Continued)

network element sends the security policy to the devices on two ends of the end-to-end communication.

20 Claims, 19 Drawing Sheets

(30) Foreign Application Priority Data

Jan. 24, 2017 (CN) .................... 201710060318.2
Mar. 27, 2017 (WO) ............... PCT/CN2017/078312

(51) Int. Cl.
*H04L 29/06* (2006.01)
*H04L 9/08* (2006.01)
*H04W 12/0431* (2021.01)
*H04W 12/10* (2021.01)

(52) U.S. Cl.
CPC .......... *H04L 63/062* (2013.01); *H04L 63/105* (2013.01); *H04L 63/20* (2013.01); *H04L 63/205* (2013.01); *H04W 12/0431* (2021.01); *H04W 12/10* (2013.01)

(58) Field of Classification Search
CPC .. H04W 8/08; H04W 12/0433; H04L 63/205; H04L 9/08; H04L 63/105; H04L 63/062; H04L 63/0428; H04L 63/20; H04L 9/083; H04L 9/0861
See application file for complete search history.

(56) References Cited

U.S. PATENT DOCUMENTS

| | | | |
|---|---|---|---|
| 2010/0262825 A1 | 10/2010 | Yoon et al. | |
| 2010/0263021 A1* | 10/2010 | Arnott | H04L 69/24 726/1 |
| 2010/0293595 A1 | 11/2010 | Naslund et al. | |
| 2012/0066737 A1 | 3/2012 | Zhang et al. | |
| 2015/0033312 A1 | 1/2015 | Seed et al. | |
| 2015/0281276 A1 | 10/2015 | U | |
| 2015/0295936 A1 | 10/2015 | Wang | |
| 2019/0082325 A1* | 3/2019 | Muhanna | H04L 63/205 |

FOREIGN PATENT DOCUMENTS

| | | |
|---|---|---|
| CN | 101188492 | 5/2008 |
| CN | 101207480 A | 6/2008 |
| CN | 101296225 A | 10/2008 |
| CN | 101330469 A | 12/2008 |
| CN | 101483860 A | 7/2009 |
| CN | 101557289 A | 10/2009 |
| CN | 101854625 A | 10/2010 |
| CN | 101990202 A | 3/2011 |
| CN | 102149088 A | 8/2011 |
| CN | 104092668 A | 10/2014 |
| CN | 105493524 A | 4/2016 |
| EP | 2770767 B1 | 2/2017 |
| EP | 2201745 B1 | 6/2018 |
| JP | 2008154103 A | 7/2008 |
| JP | 2010539761 A | 12/2010 |
| JP | 2010539839 A | 12/2010 |
| JP | 2012195969 A | 10/2012 |
| RU | 2573745 C2 | 1/2016 |
| WO | 2009057730 A2 | 5/2009 |

OTHER PUBLICATIONS

3GPP TR 23.799 V0.5.0 (May 2016),3rd Generation Partnership Project;Technical Specification Group Services and System Aspects;Study on Architecture for Next Generation System(Release 14),total 178 pages.

R1-151234 Alcatel-Lucent et al.,"PRACH for LC-MTC", 3GPP TSG RAN WG1 Meeting #80bis,Belgrade, Serbia, Apr. 20-24, 2015,total 4 pages.

Qualcomm Incorporated: "Solution X for Key Issue 12 on Authentication Framework", SA WG2 Meeting #114; S2-161497, total 4 pages. XP051086799.

Anonymous: "3rd Generation Partnership Project; Technical Specification Group Services and System Aspects; Study on the security aspects of the next generation system (Release 14) 3GPP TR 33.899, v0.2.0", Jun. 14, 2016, XP055647865, 75 pages.

* cited by examiner

KEY CONFIGURATION METHOD, SECURITY POLICY DETERMINING METHOD, AND APPARATUS

CROSS-REFERENCE TO RELATED APPLICATIONS

This application is a continuation of International Application No. PCT/CN2017/083265, filed on May 5, 2017, which claims priority to International Patent Application No. PCT/CN2017/078312, filed on Mar. 27, 2017, and which claims priority to Chinese Patent Application No. 201710060318.2, filed on Jan. 24, 2017 and Chinese Patent Application No. 201610592312.5, filed on Jul. 25, 2016, and Chinese Patent Application No. 201610511486.4, filed on Jul. 1, 2016. The disclosures of the aforementioned applications are hereby incorporated by reference in their entireties.

TECHNICAL FIELD

This application relates to the communications field, and in particular, to a key configuration method, a security policy determining method, and an apparatus.

BACKGROUND

In a future (for example, the 5th-generation) mobile communications architecture, a session management network element sets up a session between user equipment and a gateway (or a DN server or another user equipment) based on a service requirement of the user equipment.

None of existing session security algorithms are applicable to the future mobile communications architecture. Therefore, how to set up a security mechanism based on the future mobile communications architecture becomes an urgent problem to be resolved currently.

SUMMARY

This application provides a key configuration method, a security policy determining method, and an apparatus, to resolve a problem of how to set up a security mechanism based on a future mobile communications architecture.

A first aspect of this application provides a key configuration method, including the following steps: A session management network element receives a request for end-to-end communication, where the request for end-to-end communication includes an identity of user equipment used as one end of the end-to-end communication; the session management network element obtains a security policy, where the security policy is determined based on at least one of: a user security requirement that is of the user equipment and that is preconfigured on a home subscriber server, a service security requirement from the user equipment, a security capability requirement supported by the user equipment, a security capability requirement from a carrier network, and a security requirement of a device on the other end of the end-to-end communication; the session management network element obtains a protection key, where the protection key is used to protect the end-to-end communication, and the protection key is determined based on the security policy and a shared key between the user equipment and the carrier network; the session management network element sends the security policy and/or the protection key to the user equipment; and the session management network element sends the security policy and/or the protection key to the device on the other end of the end-to-end communication. It can be learned from the foregoing processes that the session management network element can configure a session protection key for the devices on two ends of the end-to-end communication, to improve security of the end-to-end communication. In addition, higher security is implemented as compared with an existing segment-based encryption manner.

A second aspect of this application discloses a session management network element, including a communications component and a processor. Specifically, the communications component is configured to receive a request for end-to-end communication, where the request for end-to-end communication includes an identity of user equipment used as one end of the end-to-end communication. The processor is configured to: obtain a security policy, where the security policy is determined based on at least one of: a user security requirement that is of the user equipment and that is preconfigured on a home subscriber server, a service security requirement from the user equipment, a security capability requirement supported by the user equipment, a security capability requirement from a carrier network, and a security requirement of a device on the other end of the end-to-end communication; and obtain a protection key, where the protection key is used to protect the end-to-end communication, and the protection key is determined based on the security policy and a shared key between the user equipment and the carrier network. The communications component is further configured to: send the security policy and/or the protection key to the user equipment; and send the security policy and/or the protection key to the device on the other end of the end-to-end communication.

In an implementation, the request for end-to-end communication further includes at least one of: a network identity and a service parameter. The at least one of: the network identity and the service parameter may be used to generate a subsequent key.

In an implementation, the obtaining a protection key includes: obtaining the protection key through derivation based on the security policy, the shared key, and a parameter, where the parameter includes at least one of: the identity of the user equipment, the network identity, and the service parameter.

In an implementation, before the session management network element obtains the protection key through derivation based on the security policy, the shared key, and the parameter, the following is further included: The session management network element sends a security policy request to a policy control network element of the carrier, where the security policy request includes at least one of: the identity of the user equipment, the network identity, and the service parameter, and the at least one of: the identity of the user equipment, the network identity, and the service parameter is used by the policy control network element to identify the security policy; and the session management network element receives the security policy sent by the policy control network element of the carrier.

In an implementation, the security policy request further includes a security requirement set obtained by the session management network element in advance, where the security requirement set includes at least one of: the user security requirement that is of the user equipment and that is preconfigured on the home subscriber server, the service security requirement from the user equipment, the security capability requirement supported by the user equipment, and the security requirement of the device on the other end of the end-to-end communication.

In an implementation, before the session management network element obtains the protection key through derivation based on the security policy, the shared key, and the parameter, the following is further included: obtaining at least one of: the user security requirement that is of the user equipment used as one end of the end-to-end communication and that is preconfigured on the home subscriber server, the service security requirement from the user equipment, the security capability requirement supported by the user equipment, the security capability requirement from the carrier network, and the security requirement of the device on the other end of the end-to-end communication; and determining the security policy based on the obtained at least one of: the user security requirement that is of the user equipment used as one end of the end-to-end communication and that is preconfigured on the home subscriber server, the service security requirement from the user equipment, the security capability requirement supported by the user equipment, the security capability requirement from the carrier network, and the security requirement of the device on the other end of the end-to-end communication.

In an implementation, a specific implementation of the obtaining the user security requirement that is of the user equipment used as one end of the end-to-end communication and that is preconfigured on the home subscriber server is: sending a security requirement request to a network element in the carrier network after receiving the request for end-to-end communication, to obtain the user security requirement that is of the user equipment and that is preconfigured on the home subscriber server; or obtaining, from the request for end-to-end communication, the user security requirement that is of the user equipment and that is preconfigured on the home subscriber server.

In an implementation, a specific implementation of the obtaining the service security requirement from the user equipment and the security capability requirement supported by the user equipment is: obtaining, from the request for end-to-end communication, the service security requirement from the user equipment and/or the security capability requirement supported by the user equipment.

In an implementation, a specific implementation of the obtaining the security capability requirement from the carrier network is: sending a security requirement request to the policy control network element in the carrier network, where the security requirement request includes at least one of: the identity of the user equipment and the network identity; and receiving the security capability requirement from the carrier network that is sent by the policy control network element in the carrier network, where at least one of: the identity of the user equipment and the network identity is used by the policy control network element to identify the security capability requirement from the carrier network.

In an implementation, a specific implementation of the obtaining the security requirement of the device on the other end of the end-to-end communication is: sending a security requirement request to the policy control network element in the carrier network; and receiving the security requirement that is of the device on the other end of the end-to-end communication and that is sent by the policy control network element in the carrier network; or sending a security requirement request to the device on the other end of the end-to-end communication, and receiving the security requirement that is of the device on the other end of the end-to-end communication and that is sent by the device on the other end of the end-to-end communication, where the security requirement request includes at least one of: the identity of the user equipment and the service parameter, and the at least one of: the identity of the user equipment and the service parameter is used by the device on the other end of the end-to-end communication to search for the security requirement of the device on the other end of the end-to-end communication.

In an implementation, a specific implementation of the determining the security policy based on the at least one of: the user security requirement that is of the user equipment used as one end of the end-to-end communication and that is preconfigured on the home subscriber server, the service security requirement from the user equipment, the security capability requirement supported by the user equipment, the security capability requirement from the carrier network, and the security requirement of the device on the other end of the end-to-end communication is: determining the security policy based on one of: the user security requirement that is of the user equipment used as one end of the end-to-end communication and that is preconfigured on the home subscriber server, the service security requirement from the user equipment, the security capability requirement supported by the user equipment, the security capability requirement from the carrier network, and the security requirement of the device on the other end of the end-to-end communication; or determining the security policy according to a preset rule and based on more than one of: the user security requirement that is of the user equipment used as one end of the end-to-end communication and that is preconfigured on the home subscriber server, the service security requirement from the user equipment, the security capability requirement supported by the user equipment, the security capability requirement from the carrier network, and the security requirement of the device on the other end of the end-to-end communication.

In an implementation, before the determining the security policy based on the at least one of: the user security requirement that is of the user equipment used as one end of the end-to-end communication and that is preconfigured on the home subscriber server, the service security requirement from the user equipment, the security capability requirement supported by the user equipment, the security capability requirement from the carrier network, and the security requirement of the device on the other end of the end-to-end communication, the following is further included: The session management network element determines, based on configuration information or a node policy of the user equipment, or based on configuration information or a node policy of the user equipment that is obtained from a local storage, or based on a service security requirement, a server-side security requirement, a service type, a security capability of the user equipment, or a slicing policy, that a termination point of security protection is a user plane node (UPF); or the session management network element receives a node configuration parameter from the policy control network element of the carrier, where the node configuration parameter indicates that a termination point of security protection is a user plane node UPF.

In an implementation, the UPF is a UPF in a visited public land mobile communications network VPLMN, and the security capability requirement from the carrier network is a security requirement of a gateway in the VPLMN; or the UPF is a UPF in a home public land mobile communications network HPLMN, and the security capability requirement from the carrier network is a security requirement of a gateway in the HPLMN.

In an implementation, content of the security requirement includes a security protection algorithm, where the security protection algorithm includes an encryption algorithm and/or an integrity protection algorithm.

In an implementation, the content of the security requirement further includes a key length and/or a key update time.

In an implementation, a format of the security requirement includes a plurality of octets, where the plurality of octets include any one of the following: an octet used to indicate an identity of the security requirement, an octet used to indicate a length of the content of the security requirement, an octet used to indicate whether the encryption algorithm is required in the security requirement, an octet used to indicate whether the integrity protection algorithm is required in the security requirement, an octet used to indicate a length of the encryption algorithm, an octet used to indicate a length of the integrity protection algorithm, an octet used to indicate whether a key needs to be updated, an octet used to indicate a specific encryption algorithm, and an octet used to indicate a specific integrity protection algorithm.

In an implementation, before the session management network element obtains the protection key through derivation based on the security policy, the shared key, and a parameter, the following is further included: receiving the shared key sent by a key management center in the carrier network; or locally obtaining the shared key.

In an implementation, the obtaining the protection key includes: sending a key request to a key management center of the carrier, where the key request includes at least one of: the identity of the user equipment, the network identity, the service parameter, and the security policy, and the at least one of: the identity of the user equipment, the network identity, and the service parameter is used by the key management center to determine the shared key; and receiving the protection key sent by the key management center.

In an implementation, the method further includes: sending, by the session management network element, the network identity to one end of the end-to-end communication; and/or sending, by the session management network element, the network identity to the device on the other end of the end-to-end communication.

A third aspect of this application provides a key configuration method, including the following steps: A key management center receives a key request, determines a shared key between the user equipment and a carrier network based on an identity of the user equipment, and generates, based on the security policy, the shared key, and the parameter, a protection key that is used to protect the end-to-end communication; and the key management center sends the protection key to the user equipment, and sends the protection key to a device on the other end of the end-to-end communication. The key request includes a security policy and a parameter, the parameter includes at least one of: the identity of user equipment used as one end of the end-to-end communication, a network identity, and a service parameter, and the security policy is determined based on at least one of: a user security requirement that is of the user equipment and that is preconfigured on a home subscriber server, a service security requirement from the user equipment, a security capability requirement supported by the user equipment, a security capability requirement from the carrier network, and a security requirement of a device on the other end of the end-to-end communication.

A fourth aspect of this application provides a key management center, including a communications component and a processor. The communications component is configured to receive a key request. The processor is configured to: determine a shared key between the user equipment and a carrier network based on an identity of the user equipment; and generate a protection key based on the security policy, the shared key, and the parameter. The communications component is further configured to: send the protection key to the user equipment; and send the protection key to a device on the other end of the end-to-end communication. The parameter includes at least one of: an identity of the user equipment used as one end of the end-to-end communication, a network identity, and a service parameter, and the security policy is determined based on at least one of: a user security requirement that is of the user equipment and that is preconfigured on a home subscriber server, a service security requirement from the user equipment, a security capability requirement supported by the user equipment, a security capability requirement from the carrier network, and a security requirement of the device on the other end of the end-to-end communication.

In an implementation, after the key management network element generates the protection key based on the security policy, the shared key, and the parameter, the following is further included: The key management network element sends the protection key to a session management network element of the carrier.

In an implementation, the shared key is a shared key between the user equipment and the carrier network that is obtained after two-way authentication is performed between the user equipment and the carrier network.

A fifth aspect of this application provides a key configuration method, including: sending, by user equipment, a request including an identity of the user equipment; receiving, by the user equipment, a response carrying a security policy, where the security policy is determined based on at least one of: a user security requirement that is of the user equipment and that is preconfigured on a home subscriber server, a service security requirement from the user equipment, a security capability requirement supported by the user equipment, a security capability requirement from a carrier network, and a security requirement of a device on the other end of the end-to-end communication; and obtaining, by the user equipment, a protection key, where the protection key is used to protect the end-to-end communication, and the protection key is determined based on the security policy and a shared key between the user equipment and the carrier network.

A sixth aspect of this application provides user equipment, including a communications component and a processor. The communications component is configured to: send a request including an identity of the user equipment; and receive a response carrying a security policy. The security policy is determined based on at least one of: a user security requirement that is of the user equipment and that is preconfigured on a home subscriber server, a service security requirement from the user equipment, a security capability requirement supported by the user equipment, a security capability requirement from a carrier network, and a security requirement of a device on the other end of the end-to-end communication. The processor is configured to obtain a protection key, where the protection key is used to protect the end-to-end communication, and the protection key is determined based on the security policy and a shared key between the user equipment and the carrier network.

In an implementation, a specific implementation of the sending, by user equipment, a request is: sending, by the user equipment, a service parameter and a security requirement set, where the security requirement set includes the service security requirement from the user equipment and/or the security capability requirement supported by the user equipment.

In an implementation, the request further includes: a session ID, a bearer ID, a flow ID, or a slice ID that is generated by the user equipment.

In an implementation, the obtaining a protection key includes: obtaining the protection key through derivation based on the security policy, the shared key, and a parameter, where the parameter includes at least one of: the identity of the user equipment, the network identity, and the service parameter.

In an implementation, before the obtaining the protection key through derivation based on the security policy, the shared key, and a parameter, the following is further included: receiving the shared key sent by a key management center of the carrier; or locally obtaining the shared key; or obtaining the shared key between the user equipment and the carrier network after two-way authentication is performed between the user equipment and the carrier network.

In an implementation, before the obtaining the protection key through derivation based on the security policy, the shared key, and a parameter, the following is further included: receiving the network identity sent by a session management network element in the carrier network.

In an implementation, the obtaining a protection key includes: receiving, by the user equipment, the protection key sent by a key management center or a session management network element in the carrier network.

A seventh aspect of this application provides a security policy determining method, including: receiving, by a policy control network element of a carrier, a security policy request, where the security policy request includes a parameter and at least one of: a user security requirement that is of the user equipment and that is preconfigured on a home subscriber server, a service security requirement from the user equipment, and a security capability requirement supported by the user equipment, and the parameter includes at least one of: an identity of the user equipment used as one end of the end-to-end communication, a network identity, and a service parameter; and generating and sending, by the policy control network element, a security policy based on a security requirement set, where the security requirement set includes at least one of: the user security requirement that is of the user equipment and that is preconfigured on the home subscriber server, the service security requirement from the user equipment, and the security capability requirement supported by the user equipment.

An eighth aspect of this application provides a policy control network element, including a communications component and a processor. The communications component is configured to receive a security policy request, where the security policy request includes a parameter and at least one of: a user security requirement that is of the user equipment and that is preconfigured on a home subscriber server, a service security requirement from the user equipment, and a security capability requirement supported by the user equipment, and the parameter includes at least one of: an identity of the user equipment used as one end of the end-to-end communication, a network identity, and a service parameter. The processor is configured to generate a security policy based on a security requirement set, where the security requirement set includes at least one of: the user security requirement that is of the user equipment and that is preconfigured on the home subscriber server, the service security requirement from the user equipment, and the security capability requirement supported by the user equipment. The communications component is further configured to send the security policy.

In an implementation, the security requirement set further includes at least one of: a security capability requirement from a carrier network and a security requirement of a device on the other end of the end-to-end communication.

In an implementation, obtaining the security requirement of the carrier network includes: after receiving the security policy request, locally obtaining a pre-stored security requirement of the carrier network.

In an implementation, obtaining the security requirement of the device on the other end of the end-to-end communication includes: receiving a security requirement that is of the device on the other end of the end-to-end communication and that is sent by the session management network element; or sending a security requirement request to the device on the other end of the end-to-end communication, and receiving a security requirement sent by the device on the other end of the end-to-end communication, where the security requirement request includes at least one of: the identity of the user equipment, the network identity, and the service parameter, and the at least one of: the identity of the user equipment, the network identity, and the service parameter is used by the device on the other end of the end-to-end communication to mark the security requirement of the device on the other end of the end-to-end communication.

In an implementation, the generating a security policy based on a security requirement set includes: determining the security policy based on one of: the user security requirement that is of the user equipment used as one end of the end-to-end communication and that is preconfigured on the home subscriber server, the service security requirement from the user equipment, the security capability requirement supported by the user equipment, the security capability requirement from the carrier network, and the security requirement of the device on the other end of the end-to-end communication; or determining the security policy according to a preset rule and based on more than one of: the user security requirement that is of the user equipment used as one end of the end-to-end communication and that is preconfigured on the home subscriber server, the service security requirement from the user equipment, the security capability requirement supported by the user equipment, the security capability requirement from the carrier network, and the security requirement of the device on the other end of the end-to-end communication.

In an implementation, before the generating a security policy based on a security requirement set, the following is further included: The policy control network element of the carrier determines, based on configuration information or a node policy of the user equipment, or based on configuration information or a node policy of the user equipment that is obtained from a local storage, or based on a service security requirement, a server-side security requirement, a service type, a security capability of the user equipment, or a slicing policy, that a termination point of security protection is a user plane node UPF.

In an implementation, the UPF is a UPF in a visited public land mobile communications network VPLMN, and the security capability requirement from the carrier network is a security requirement of a gateway in the VPLMN; or the UPF is a UPF in a home public land mobile communications network HPLMN, and the security capability requirement from the carrier network is a security requirement of a gateway in the HPLMN.

In an implementation, before the generating a security policy based on a security requirement set, the following is further included: The policy control network element of the carrier determines that a termination point of security protection is a branching point or an uplink data classifier function ULCL; and the security requirement set further includes a security requirement of the branching point or the ULCL.

In an implementation, content of the security requirement includes a security protection algorithm, where the security protection algorithm includes an encryption algorithm and/or an integrity protection algorithm.

In an implementation, the content of the security requirement further includes a key length and/or a key update time.

A ninth aspect of this application provides a security policy determining method, including: receiving, by a mobility management network element, a request of user equipment, where the request of the user equipment includes an identity of the user equipment used as one end of the end-to-end communication; and sending, by the mobility management network element, a request for end-to-end communication, where the request for end-to-end communication includes the identity of the user equipment, the request for end-to-end communication is used to trigger setup of a security session, and the security policy is determined based on at least one of: a user security requirement that is of the user equipment and that is preconfigured on a home subscriber server, a service security requirement from the user equipment, a security capability requirement supported by the user equipment, and a security capability requirement from a carrier network.

A tenth aspect of this application provides a mobility management network element, including a communications component and a processor. The communications component is configured to: receive a request of user equipment, where the request of the user equipment includes an identity of the user equipment used as one end of the end-to-end communication; and send a request for end-to-end communication, where the request for end-to-end communication includes the identity of the user equipment, the request for end-to-end communication is used to trigger setup of a security session, and the security policy is determined based on at least one of: a user security requirement that is of the user equipment and that is preconfigured on a home subscriber server, a service security requirement from the user equipment, a security capability requirement supported by the user equipment, and a security capability requirement from a carrier network.

In an implementation, before the mobility management network element sends the request for end-to-end communication, the following is further included: The mobility management network element generates a network identity. The request for end-to-end communication further includes the network identity.

In an implementation, the following is further included: The mobility management network element obtains, from the home subscriber server, a user identity and the user security requirement that is of the user equipment and that is preconfigured on the home subscriber server; and obtains, based on the identity of the user equipment in the request for end-to-end communication, the user security requirement that is of the user equipment and that is preconfigured on the home subscriber server.

In an implementation, the request for end-to-end communication further includes the user security requirement that is of the user equipment and that is preconfigured on the home subscriber server.

In an implementation, the request of the user equipment further includes at least one of: a service parameter, the service security requirement from the user equipment, and the security capability requirement supported by the user equipment.

In an implementation, the request for end-to-end communication further includes at least one of: the service parameter, the service security requirement from the user equipment, and the security capability requirement supported by the user equipment.

An eleventh aspect of this application provides a security policy determining method, including: receiving, by a home subscriber server, a security requirement request, where the security requirement request includes a user identity, and the home subscriber server stores a user security requirement that is of the user equipment and that is preconfigured on the home subscriber server; determining, by the home subscriber server based on the user identity, the user security requirement that is of the user equipment and that is preconfigured on the home subscriber server; and sending, by the home subscriber server, the user security requirement that is of the user equipment and that is preconfigured on the home subscriber server, where the user security requirement that is of the user equipment and that is preconfigured on the home subscriber server is used to generate a security policy.

A twelfth aspect of this application provides a home subscriber server, including: a memory, configured to store a user security requirement that is of the user equipment and that is preconfigured on the home subscriber server; a communications component, configured to receive a security requirement request that includes a user identity; and a processor, configured to determine, based on the user identity, the user security requirement that is of the user equipment and that is preconfigured on the home subscriber server. The communications component is further configured to send the user security requirement that is of the user equipment and that is preconfigured on the home subscriber server, where the user security requirement that is of the user equipment and that is preconfigured on the home subscriber server is used to generate a security policy.

A thirteenth aspect of this application provides a key configuration method, including: receiving, by a session management network element, a request for end-to-end communication, where the request for end-to-end communication includes an identity of user equipment used as one end of the end-to-end communication; obtaining, by the session management network element, a security policy, where the security policy is determined based on at least one of: a user security requirement that is of the user equipment and that is preconfigured on a home subscriber server, a service security requirement from the user equipment, a security capability requirement supported by the user equipment, a security capability requirement from a carrier network, and a security requirement of a device on the other end of the end-to-end communication; obtaining, by the session management network element, a first key, where the first key is used to protect the end-to-end communication, and the first key is determined based on the security policy and a shared key between the user equipment and the carrier network; generating, by the session management network element, an encryption protection key and/or an integrity protection key based on the security policy and the first key, where the encryption protection key is used to protect confidentiality of the end-to-end communication, and the integrity protection key is used to protect integrity of the end-to-end communication; sending, by the session management network element, the security policy to the user equipment; and sending, by the session management network element, the security policy and at least one of: the encryption protection key and the integrity protection key to the device on the other end of the end-to-end communication.

A fourteenth aspect of this application provides a session management network element, including:

a communications component, configured to receive a request for end-to-end communication, where the request for end-to-end communication includes an identity of user equipment used as one end of the end-to-end communication; and a processor, configured to: obtain a security policy, where the security policy is determined based on at least one of: a user security requirement that is of the user equipment and that is preconfigured on a home subscriber server, a service security requirement from the user equipment, a security capability requirement supported by the user equipment, a security capability requirement from a carrier network, and a security requirement of a device on the other end of the end-to-end communication; obtain a first key, where the first key is used to protect the end-to-end communication, and the first key is determined based on the security policy and a shared key between the user equipment and the carrier network; and generate an encryption protection key and/or an integrity protection key based on the security policy and the first key, where the encryption protection key is used to protect confidentiality of the end-to-end communication, and the integrity protection key is used to protect integrity of the end-to-end communication. The communications component is further configured to: send the security policy to the user equipment; and send the security policy and at least one of: the encryption protection key and the integrity protection key to the device on the other end of the end-to-end communication.

In an implementation, the session management network element sends the first key to the user equipment, so that the user equipment generates the encryption protection key and/or the integrity protection key based on the security policy and the first key.

In an implementation, the following is further included: The session management network element sends the encryption protection key and/or the integrity protection key to the user equipment.

A fifteenth aspect of this application provides a key configuration method, including: sending, by user equipment, a request including an identity of the user equipment; receiving, by the user equipment, a response carrying a security policy, where the security policy is determined based on at least one of: a user security requirement that is of the user equipment and that is preconfigured on a home subscriber server, a service security requirement from the user equipment, a security capability requirement supported by the user equipment, a security capability requirement from a carrier network, and a security requirement of a device on the other end of the end-to-end communication; and obtaining, by the user equipment, an encryption protection key and/or an integrity protection key, where the encryption protection key is used to protect confidentiality of the end-to-end communication, and the integrity protection key is used to protect integrity of the end-to-end communication.

A sixteenth aspect of this application provides user equipment, including:

a communications component, configured to: send a request including an identity of the user equipment; and receive a response carrying a security policy, where the security policy is determined based on at least one of: a user security requirement that is of the user equipment and that is preconfigured on a home subscriber server, a service security requirement from the user equipment, a security capability requirement supported by the user equipment, a security capability requirement from a carrier network, and a security requirement of a device on the other end of the end-to-end communication; and a processor, configured to obtain an encryption protection key and/or an integrity protection key.

In an implementation, the obtaining, by the user equipment, an encryption protection key and/or an integrity protection key includes: The user equipment obtains a first key, where the first key is determined based on the security policy and a shared key between the user equipment and the carrier network; and generates the encryption protection key and/or the integrity protection key based on the security policy and the first key.

In an implementation, the obtaining, by the user equipment, an encryption protection key and/or an integrity protection key includes: The user equipment receives the encryption protection key and/or the integrity protection key.

A seventeenth aspect of this application provides a security policy determining method, including: determining, by a policy control network element or a mobility management network element of a carrier, a termination point of security protection; when the termination point of the security protection is a user plane node UPF, generating, by the policy control network element or the mobility management network element, a security policy based on at least one of: a user security requirement that is of user equipment and that is preconfigured on the home subscriber server, a service security requirement from the user equipment, and a security capability requirement supported by the user equipment, and at least one of: a security capability requirement from a carrier network and a security requirement of a device on the other end of the end-to-end communication; or when the termination point of the security protection is another device, generating, by the policy control network element or the mobility management network element, a security policy based on a security requirement of the another device and at least one of: a user security requirement that is of the user equipment and that is preconfigured on the home subscriber server, a service security requirement from the user equipment, and a security capability requirement supported by the user equipment, where the another device includes a branching point or a ULCL.

An eighteenth aspect of this application provides a policy control network element or a mobility management network element, including: a processor, configured to: determine a termination point of security protection; when the termination point of the security protection is a user plane node UPF, generate a security policy based on at least one of: a user security requirement that is of user equipment and that is preconfigured on the home subscriber server, a service security requirement from the user equipment, and a security capability requirement supported by the user equipment, and at least one of: a security capability requirement from a carrier network and a security requirement of a device on the other end of the end-to-end communication; or when the termination point of the security protection is another device, generate a security policy based on a security requirement of the another device and at least one of: a user security requirement that is of the user equipment and that is preconfigured on the home subscriber server, a service security requirement from the user equipment, and a security capability requirement supported by the user equipment, where the another device includes a branching point or a ULCL.

In an implementation, the determining the termination point of security protection includes: determining the termination point of the security protection based on configuration information or a node policy of the user equipment that is received from another functional network element in the carrier network, or based on configuration information or a node policy of the user equipment that is obtained from a local storage, or based on a received service security requirement, a received server-side security requirement, a received service type, or a received slicing policy.

In an implementation, the UPF is a UPF in a visited public land mobile communications network VPLMN, and the security capability requirement from the carrier network is a security requirement of a gateway in the VPLMN; or the UPF is a UPF in a home public land mobile communications network HPLMN, and the security capability requirement from the carrier network is a security requirement of a gateway in the HPLMN.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show some embodiments of this application, and a person of ordinary skill in the art may still derive other drawings from these accompanying drawings without creative efforts.

DESCRIPTION OF EMBODIMENTS

The following describes the technical solutions in the embodiments of the present invention with reference to the accompanying drawings in the embodiments of the present invention.

Figure 1:
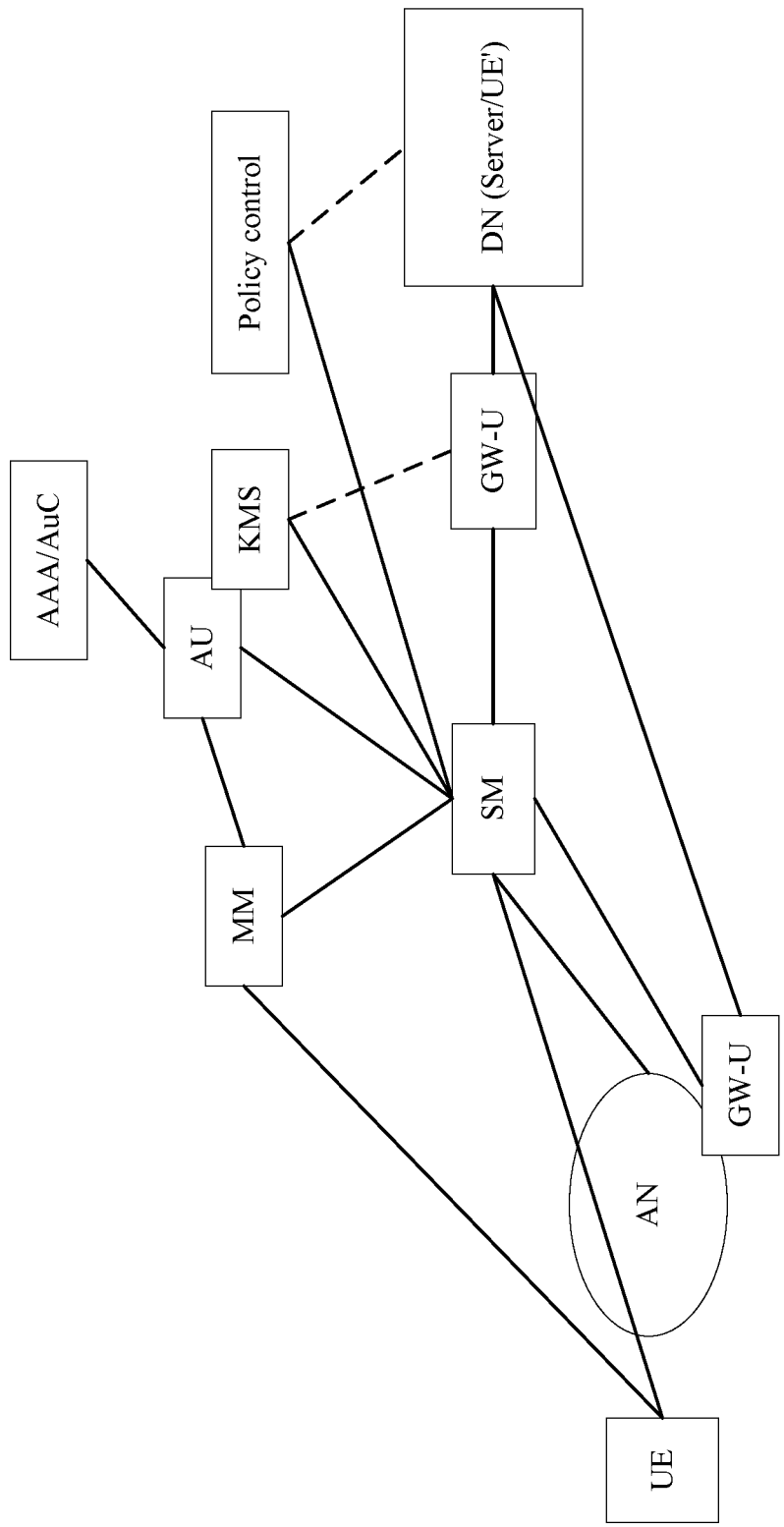
FIG. 1 is a schematic diagram of a future mobile communications network architecture.

FIG. 1 shows a future mobile communications network architecture.

User equipment (English: User Equipment, UE) is a logical entity, and may specifically include:

an intelligent device, for example, a terminal device such as a mobile phone or an intelligent terminal, a communications device such as a server, a gateway, a base station, or a controller, or an Internet of Things (IoT) device such as a sensor, a power meter, or a water meter.

The UE accesses a carrier network by using an access network (English: Access Network, AN).

The carrier network includes:

a mobility management (English: Mobility Management, MM) network element;

a session management (English: Session Management, SM) network element, configured to set up and manage a session, a slice, a flow, or a bearer bearer;

an authentication unit (English: Authentication Unit or Authentication Function, AU or AF), configured to perform two-way authentication with the UE, where the AU may be separately deployed as an independent logical functional entity, or may be deployed inside the MM or the SM, in other words, the MM or the SM plays the role of the AU;

a server node or a home subscriber server of the carrier, including an AAA server (English: Authentication, Authorization, Accounting server, authentication, authorization, accounting server), the home subscriber server (Home Subscriber Server, HSS), an authentication center (English: Authentication Center, AuC), or a subscriber registration information center (English: subscriber repository) of the carrier, where for ease of description, AAA is uniformly used for description below, and the AAA stores authentication information and subscriber information of each UE, for example, an authentication root key, a security algorithm, and subscriber registration information;

a policy control (Policy control) network element used for policy negotiation;

a key management center (English: Key Management System, KMS), which is responsible for key generation, management, and negotiation, and supports lawful interception, where the KMS may be separately deployed as an independent logical functional entity, or may be deployed inside the AU, the MM, or the SM, in other words, the AU, the MM, or the SM plays the role of the KMS;

a gateway, also referred to as a user plane gateway (English: User Plane-Gateway, UP-GW), configured to connect the carrier network and a data network (English: Data Network, DN), where the AN may also be connected to the DN by using the GW; and a DN server, including an application server, a service server, or the like, where the DN server may be deployed in the carrier network, or be deployed outside the carrier network.

It should be noted that FIG. 1 shows a logical relationship between network elements. In practice, the MM, the AU, and the SM each may be deployed independently, or may be deployed in one entity through pairwise integration. For example, the SM and the MM are deployed in one entity, and the AU is deployed independently; or the SM and the AU are deployed in one entity, and the MM is deployed independently.

Based on the architecture in FIG. 1, to protect end (UE 1) to end (a gateway, a DN server, or UE 2) communication, in this application, a key configuration apparatus is added to the architecture shown in FIG. 1, so as to configure protection keys for the UE 1 and the gateway (or the DN server or the UE 2) in the end-to-end communication, so that both the UE 1 and the gateway (or the DN server or the UE 2) can use the protection keys to encrypt the communication.

The key configuration apparatus includes a security policy determining module and a key configuration module. The security policy determining module is configured to determine a security policy based on at least one of: a security requirement of one end (to be specific, the UE 1) of the end-to-end communication, a security requirement of the other end (to be specific, the DN server or the UE 2) of the end-to-end communication, and a security requirement of the carrier network (to be specific, the gateway). The key configuration module is configured to configure, based on the security policy and a shared key between the one end (to be specific, the UE 1) of the end-to-end communication and a network element (for example, the AU, the KMS, the SM, or the MM) of the carrier network, a protection key used for protecting the end (to be specific, the UE 1) to end (the DN server or the UE 2) communication.

The shared key may be a preconfigured shared key between the UE and the network element (for example, the AU, the KMS, the SM, or the MM) of the carrier. Alternatively, a shared key may be obtained after two-way authentication is performed between the UE and the network element (for example, the AU, the KMS, the SM, or the MM) in the carrier network, and then the shared key is sent to another network element. For example, a shared key is obtained during two-way authentication between the UE and the AU, and then the AU sends the shared key to the KMS, the SM, or the MM; or a shared key may be sent to another network element after two-way authentication is performed between the UE and the KMS (or the SM or the MM).

For example, in LTE, a shared key obtained after authentication includes but is not limited to at least one of: CK, IK, and Kasme. The shared key includes but is not limited to a key form obtained after authentication in the LTE, or may include a shared key obtained after authentication is performed in another authentication manner, for example, based on a certificate, based on an identity, or based on a user plane password.

Specifically, the security requirement of the UE 1 on the one end of the end-to-end communication includes a user security requirement (for ease of subsequent description, briefly referred to as a security requirement 1 in the embodiments of this application) of the UE 1 that is preconfigured in the HSS, a service security requirement (briefly referred to as a security requirement 2) from the UE 1, and a security capability requirement (briefly referred to as a security requirement 5) supported by the UE, for example, the UE supports only a ZUC algorithm. The security requirement 1 is a user security requirement preconfigured in the HSS and exists in user subscription data. The security requirement 1 may be separately stored as a parameter, or may be a part of user QoS (quality of service, Quality of Service in English) in the HSS. The security requirement 2 is sent by the UE to the carrier network when the UE 1 initiates a communication request.

The security requirement of the carrier network, to be specific, the gateway, includes a security capability requirement (briefly referred to as a security requirement 3) from the carrier network (a gateway side). The security requirement 3 is stored in the policy control network element, may be separately stored as a parameter, or may be a part of QoS in policy control network element, or may be stored in the SM network element.

The security requirement (briefly referred to as a security requirement 4) of the other end, to be specific, the DN server (or the UE 2), of the end-to-end communication is as follows: When the UE 1 sets up communication or the DN server (or the UE 2) triggers communication setup, the DN server or the UE 2 needs to participate in some scenarios, or the DN server or the UE 2 makes a security protection request, for example, a request to use a ZUC security algorithm.

In addition, a requirement of an application function (Application Function, AF) network element may also be included. The AF sets up communication with a PCF by using an interface, or the AF sets up communication with all network function entities (for example, an SMF (session management entity, Session Management Function in English), an AMF (access and mobility management entity, Access and Mobility Management Function in English), or a PCF (policy control network element, Policy Control Function in English)) in a mobile communications network by using an open network function entity in another network.

Specifically, regardless of a specific security requirement, content of the security requirement includes a security protection algorithm, and optionally, may further include a key length and/or a key update time (for example, 6 hours, 12 hours, 1 day, 2 days, 1 month, or 1 year).

Specifically, the security protection algorithm includes an encryption algorithm and/or an integrity protection algorithm. For example, the encryption algorithm is used to specify a specific encryption algorithm to be used to perform encryption protection, including but not limited to null (a null algorithm, indicating that no encryption is performed), AES, Snow 3G, or ZUC. The integrity protection algorithm is used to specify a specific integrity protection algorithm to be used to perform integrity protection, including but not limited to null (a null algorithm, indicating that no integrity protection is performed), AES, Snow 3G, ZUC, HMAC, and CMAC. A security protection algorithm in one security requirement may include a plurality of encryption algorithms and/or a plurality of integrity protection algorithms. In this case, the security requirement further includes algorithm priority ranking; in other words, a specific algorithm that takes precedence is specified.

For example, the protection key length includes 64 bits, 128 bits, 256 bits, 512 bits, or the like. A first possibility is as follows: The security requirement includes only one protection key length, and protection key lengths are the same in subsequent encryption and integrity protection and are all a protection key length defined in the security requirement. A second possibility is as follows: The security requirement includes two protection key lengths. One is used to specify an encryption key length, and the other is used to specify an integrity protection key length.

Any one of the foregoing security requirements specifically includes at least one of: the following information: whether an encryption algorithm is required, an encryption key length, whether an integrity protection algorithm is required, an integrity protection key length, whether a key needs to be updated, and an update cycle.

Another possibility is as follows: The security requirement or the security policy includes whether encryption is required and whether integrity protection is required, or may further include a key length or a key update time. Similarly, a finally determined security policy may include whether encryption is required and whether integrity protection is required, or may further include a key length or a key update time.

Another possibility is as follows: The security requirement or the security policy includes whether integrity protection is required, or may further include whether encryption is required, a key length, or a key update time. Similarly, a finally determined security policy may include whether integrity protection is required, or may further include whether encryption is required, a key length, or a key update time.

Another possibility is as follows: The security requirement or the security policy includes whether encryption is required, or may further include whether integrity protection is required, a key length, or a key update time. Similarly, a finally determined security policy may include whether encryption is required, or may further include whether integrity protection is required, a key length, or a key update time.

There may be a plurality of possibilities for a format of the security requirement. Some possibilities of specific formats are provided below, as shown in Table 1 to Table 5.

TABLE 1

|  | Security requirement IEI | | | | | | | Octet 1 |
|---|---|---|---|---|---|---|---|---|
|  | Length of security requirement content | | | | | | | Octet 2 |
| EA Y/N | 128 | 256 | — | — | — | — | — | Octet 3 |
| IA Y/N | 128 | 256 | — | — | — | — | — | Octet 4 |
| Update Y/N | 24 | 48 | — | — | — | — | — | Octet 5 |

In Table 1, the EA indicates an encryption algorithm encryption algorithm, the IA indicates an integrity protection algorithm integrity algorithm, the security requirement IEI indicates an identity of a security requirement, and the length of security requirement contents indicates a length of content of a security requirement.

It can be learned from Table 1 that the security requirement includes five octets. The octet 1 is used to indicate the security requirement identity, and the octet 2 is used to indicate the length of security requirement content.

The octet 3 is used to indicate whether an encryption algorithm is required and an encryption key length. A value of a most significant bit in the octet 3 is used to indicate whether an encryption algorithm is required. 0 indicates that no encryption algorithm is required, and 1 indicates that an encryption algorithm is required. Remaining seven bits may separately indicate the encryption key length. For example, in Table 1, a second most significant bit indicates that the encryption key length is 128, and following bits may separately indicate that the encryption key length is 256 and the like (Table 1 shows only two examples: 128 and 256, and other lengths may be set based on actual requirements). When a value of the bit indicating the encryption key length is 0, it indicates that the length indicated by the bit is not used; when a value of the bit indicating the encryption key length is 1, it indicates that the length indicated by the bit is used. If values of a plurality of bits indicating the encryption key length are 1, it indicates that the security requirement supports encryption keys of a plurality of lengths.

The octet 4 is used to indicate whether an integrity protection algorithm is required and an integrity protection key length. A value of a most significant bit in the octet is used to indicate whether an integrity protection algorithm is required. 0 indicates that no integrity protection algorithm is required, and 1 indicates that an integrity protection algorithm is required. Remaining seven bits may separately indicate the integrity protection key length. For example, in Table 1, a second most significant bit indicates that the integrity protection key length is 128, and following bits may separately indicate that the integrity protection key length is 256 and the like (Table 1 shows only two examples: 128 and 256, and other lengths may be set based on actual requirements). When a value of the bit indicating the integrity protection key length is 0, it indicates that the length indicated by the bit is not used; when a value of the bit indicating the integrity protection key length is 1, it indicates that the length indicated by the bit is used. If values of a plurality of bits indicating the integrity protection key length are 1, it indicates that the security requirement supports integrity protection keys of a plurality of lengths.

The octet 5 is optional and is used to indicate whether a key needs to be updated and an update cycle. A value of a most significant bit in the octet 5 is used to indicate whether a key needs to be updated. 0 indicates that no key needs to be updated, and 1 indicates that a key needs to be updated. Remaining seven bits may separately indicate the update cycle. For example, in Table 1, a second most significant bit indicates that the update cycle is 24 hours, and following bits may separately indicate that the update cycle is 48 hours and the like (Table 1 shows only two examples: 24 hours and 48 hours, and other cycles may be set based on actual requirements). When a value of the bit indicating the update cycle is 0, it indicates that the cycle is not used; when a value of the bit indicating the update cycle is 1, it indicates that the cycle is used. If values of a plurality of bits indicating the update cycle are 1, it indicates that the security requirement supports a plurality of update cycles.

It should be noted that a meaning indicated by a specific bit of a specific octet provided in each of Table 1 and the following tables is an example. In this embodiment, examples in the tables are not used for limitation. For example, a sixth bit and a seventh bit in the octet 3 in Table 1 indicate the encryption key length. In addition, the encryption key length may also be indicated by another bit in the octet 3, and is not limited to the seventh bit and the sixth bit in the octet 3. For another example, other bits other than a seventh bit and a sixth bit in the octet 4 in Table 1 may also be used to indicate the integrity protection key length.

TABLE 2

|  | Security requirement IEI | | | | | | | Octet 1 |
|---|---|---|---|---|---|---|---|---|
|  | Length of security requirement content | | | | | | | Octet 2 |
| Null | 128 | 256 | — | — | — | — | — | Octet 3 |
| Null | 128 | 256 | — | — | — | — | — | Octet 4 |
| Null | 24 | 48 | — | — | — | — | — | Octet 5 |

Table 2 differs from Table 1 in that most significant bits of the octet 3 to the octet 5 are all indicated by null. If a value of the most significant bit is 1, it indicates a null algorithm; in other words, no algorithm is required. For example, if the value of the most significant bit in the octet 3 is 1, it indicates that no encryption calculation is required; and if the value of the most significant bit in the octet 3 is 0, it indicates that an encryption calculation is required (alternatively, meanings of the values may be exchanged). Alternatively, most significant bits of the octet 3 and the octet 4 represent a key length 0, and if a value of the most significant bit is 1, it indicates that no encryption is required.

TABLE 3

| Security requirement IEI | | | | | | | | Octet 1 |
|---|---|---|---|---|---|---|---|---|
| Length of UE security capability contents | | | | | | | | Octet 2 |
| EEA0 | 128-EEA1 | 128-EEA2 | 128-EEA3 | EEA4 | EEA5 | EEA6 | EEA7 | Octet 3 |
| EIA0 | 128-EIA1 | 128-EIA2 | 128-EIA3 | EIA4 | EIA5 | EIA6 | EIA7 | Octet 4 |
| UEA0 | UEA1 | UEA2 | UEA3 | UEA4 | UEA5 | UEA6 | UEA7 | Octet 5 |
| 0 spare | UIA1 | UIA2 | UIA3 | UIA4 | UIA5 | UIA6 | UIA7 | Octet 6 |
| 0 spare | GEA1 | GEA2 | GEA3 | GEA4 | GEA5 | GEA6 | GEA7 | Octet 7 |

In Table 3, the EEA0 indicates an evolved packet system (Evolved Packet System, EPS) encryption algorithm 0, where EEA represents an EPS encryption algorithm. The M0 indicates an EPS integrity protection algorithm 0, where EIA represents an EPS integrity algorithm.

The UEA0 indicates a Universal Mobile Telecommunications System (Universal Mobile Telecommunications System, UMTS) encryption algorithm 0, where UEA represents a UMTS encryption algorithm, namely, a UMTS encryption algorithm. The UIA0 indicates a UMTS integrity algorithm 0, where UIA represents a UMTS integrity algorithm, namely, a UMTS integrity algorithm.

Spare indicates an idle bit and is set to 0.

The GEA indicates a general packet radio service (General Packet Radio Service, GPRS) encryption algorithm, namely, a GPRS encryption algorithm.

The octets 5 and 6 are optional. For example, when a UMTS access technology needs to be supported, the octet 5 and the octet 6 need to be included; when a GPRS access technology needs to be supported, the octet 7 needs to be included.

Table 3 differs from Table 1 and Table 2 in that Table 1 and Table 2 show at least one of: whether encryption is required, a key length, and a time length, and Table 3 shows a specific supported security algorithm.

TABLE 4

| Security requirement IEI | | | | | | | | Octet 1 |
|---|---|---|---|---|---|---|---|---|
| Length of UE security capability content | | | | | | | | Octet 2 |
| EEA0 | 128-EEA1 | 128-EEA2 | 128-EEA3 | EEA4 | EEA5 | EEA6 | EEA7 | Octet 3 |
| EIA0 | 128-EIA1 | 128-EIA2 | 128-EIA3 | EIA4 | EIA5 | EIA6 | EIA7 | Octet 4 |
| UEA0 | UEA1 | UEA2 | UEA3 | UEA4 | UEA5 | UEA6 | UEA7 | Octet 5 |
| 0 spare | UIA1 | UIA2 | UIA3 | UIA4 | UIA5 | UIA6 | UIA7 | Octet 6 |
| 0 spare | GEA1 | GEA2 | GEA3 | GEA4 | GEA5 | GEA6 | GEA7 | Octet 7 |
| EEA Y/N | 128 | 256 | — | — | — | — | — | Octet 8 |
| EIA Y/N | 128 | 256 | — | — | — | — | — | Octet 9 |
| Update | 24 | 48 | 96 | — | — | — | — | Octet 10 |

Table 4 differs from Table 3 in that the octets 8 to 10 are added based on Table 3. For definitions of the octets 8 to 10, refer to Table 1. For definitions of the octets 3 to 7, refer to Table 4.

In addition, the octets 8 to 10 may be replaced with functions of the octets 3 to 5 in Table 2. In this case, for descriptions of the functions of the octets 3 to 5, refer to Table 2.

TABLE 5

| Security requirement IEI | | | | | | | | Octet 1 |
|---|---|---|---|---|---|---|---|---|
| Length of UE security capability contents | | | | | | | | Octet 2 |
| NEA0 | NEA1 | NEA2 | NEA3 | NEA4 | NEA5 | NEA6 | NEA7 | Octet 3 |
| NIA0 | NIA1 | NIA2 | NIA3 | NIA4 | NIA5 | NIA6 | NIA7 | Octet 4 |
| EEA0 | 128-EEA1 | 128-EEA2 | 128-EEA3 | EEA4 | EEA5 | EEA6 | EEA7 | Octet 5 |
| EIA0 | 128-EIA1 | 128-EIA2 | 128-EIA3 | EIA4 | EIA5 | EIA6 | EIA7 | Octet 6 |
| UEA0 | UEA1 | UEA2 | UEA3 | UEA4 | UEA5 | UEA6 | UEA7 | Octet 7 |
| 0 spare | UIA1 | UIA2 | UIA3 | UIA4 | UIA5 | UIA6 | UIA7 | Octet 8 |
| 0 spare | GEA1 | GEA2 | GEA3 | GEA4 | GEA5 | GEA6 | GEA7 | Octet 9 |

Table 5 differs from Table 3 in that an encryption algorithm and an integrity protection algorithm for next-generation communication are added in Table 5.

The NEA0 indicates a next-generation communication encryption algorithm 0, where NEA represents a next-generation encryption algorithm, namely, a next-generation encryption algorithm. The NIA0 indicates a next-generation integrity protection algorithm 0, where NIA represents a next-generation integrity algorithm, namely, a next-generation integrity algorithm.

In addition, other possibilities include a processing mechanism similar to that in Table 4. Table 5 is combined with Table 1 to reflect an enhanced security requirement; or Table 5 is combined with Table 2 to reflect an enhanced security requirement.

The foregoing Tables 1 to 3 and Table 4 further include the following possibility: Only one key length is included, and in this case, an encryption key length is the same as an integrity protection key length.

It should be noted that Table 1 to Table 5 are merely examples of the format of the security requirement. In addition, the security requirement may further include content such as a priority (indicated by a bit value in a specific format) of the security requirement, or the security requirement includes at least one of: the foregoing content.

In addition, the security requirement may further include a function of selecting a security termination point. To be specific, one byte is added, and one bit represents whether a user plane protection termination point is an access network node or a core network user plane function node.

In addition, two requirements for the foregoing service security requirement and/or server-side security requirement may also reflect a feature indicating whether encryption is performed at an upper layer of a service. For example, one byte may be added in the foregoing representation manner, to implement the feature indicating whether the service is encrypted.

Specific implementations of functions of a security policy determining module and a key generation module in a key configuration apparatus are separately described in detail below with reference to the network elements in FIG. 1.

It should be noted that protection of the end-to-end communication in this application includes end-to-end session protection, and also includes end-to-end protection that is based on a slice, a flow, or a bearer. The end-to-end session protection is used as an example below for description. Because UE 2 is not included in the following drawings, the following UE is UE 1.

The security policy determining module may be disposed in the UE 1, the network element (for example, the AN, the MM, the AU, the KMS, the AAA, the SM, or the policy control network element) in the carrier network, the gateway, the network element (for example, the DN server) in the DN, or the UE 2 shown in FIG. 1. A security policy may be determined in a network attachment process of the UE, or may be determined after the UE is attached to a network. Descriptions are separately provided below by using examples in which the security policy determining module is disposed in the policy control network element and in which the security policy determining module is disposed in the SM.

Figure 2:
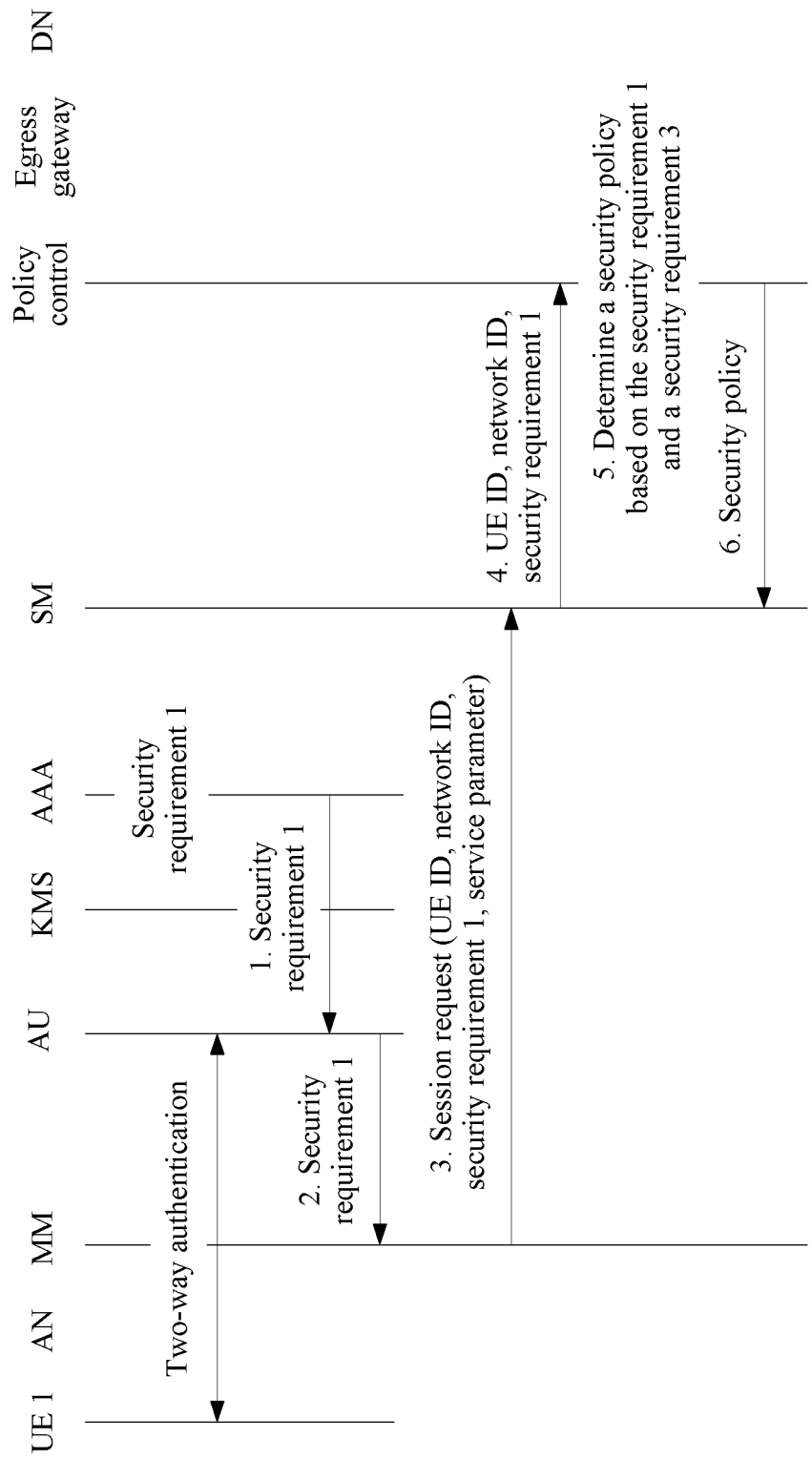
FIG. 2 is a flowchart of a security policy determining method according to an embodiment of this application.

FIG. 2 shows a procedure in which a policy control network element determines a security policy (in other words, a security policy determining module is disposed in the policy control network element), and the procedure includes the following steps.

1. In a network attachment process, UE 1 accesses a network, and after two-way authentication is performed, an AU obtains a security requirement 1 from an AAA.

It should be noted that a home subscriber server receives a security requirement request of the AU that includes a user identity, determines the security requirement 1 based on the user identity, and then sends the security requirement 1 to the AU.

2. The AU sends the security requirement 1 to an MM.

3. The MM generates a network identity (Identity, ID), for example, a session ID, and initiates a session request to an SM. The session request includes:

(a) UE ID: used by the network to identify a user, including but not limited to at least one of: an IMEI, an International Mobile Subscriber Identity (International Mobile Subscriber Identity, IMSI), an IP Multimedia Private Identity (IP Multimedia Private Identity, IMPI), a TMSI, an IP Multimedia Public Identity (IP Multimedia Public Identity, IMPU), an app ID of the user, a MAC address, an IP address, a mobile phone number, and a GUTI. For ease of description, the UE ID is uniformly used for representation in subsequent embodiments.

(b) Network ID (optional): used by the network to identify a procedure (for example, a slice, a bearer, a session, or a flow) in which the user is located, including but not limited to at least one of: a session ID, a bearer ID, a flow ID, a slice ID, and a PLMN ID.

(c) Security requirement 1.

(d) Service parameter (optional): used by the network to identify a service or an application of the user, and a related service feature, including at least one of: a service ID, an app ID, a server ID, a sequence number SN in the service, a timestamp, and a fresh parameter (Fresh parameter 1).

It should be noted that the foregoing UE ID and/or the service parameter may be obtained by the MM from an access message sent by the UE to the MM; or may be directly obtained from the AU or the AAA, and in this case, the AU or the AAA obtains the UE ID and/or the service parameter from a message used by the UE to access the network.

In addition, the MM may directly obtain the security requirement 1 from the AAA.

In addition, when the UE accesses the network, the UE may send a security requirement 2 and/or a security requirement 5 to the network, and in this case, the session request sent by the MM also includes the security requirement 2 and/or the security requirement 5.

4. After receiving the session request, the SM sends the security requirement 1 to the policy control network element, and may further send the UE ID and the network ID (for example, the session ID) to the policy control network element.

Optionally, the SM may add the security requirement 1 to a policy request message and send the policy request message to the policy control network element. Optionally, the request message may further include at least one of: the UE ID and the network ID.

Optionally, if the SM receives the security requirement 2 and/or the security requirement 5 from the MM, the SM sends the security requirement 2 and/or the security requirement 5 to the policy control.

5. The policy control network element obtains a locally prestored security requirement 3, or at least one of: the security requirement 1, the security requirement 2, a security requirement 3, and the security requirement 5, and determines a security policy based on the security requirement 1 and the security requirement 3.

Specifically, the security policy is determined according to the following rule: determining the security policy based on content of one or more security requirements. If the security policy is determined based on content of only one security requirement, content of the security policy is the same as the content of the security requirement. If the security policy is determined based on content of a plurality of security requirements, the following rules may be followed:

First, the security policy is determined according to a higher-security rule. To be specific, content with higher security in the content of the plurality of security requirements is used as content of the security policy.

For example, if a protection key length is 64 in content of the security requirement 1 and a protection key length is 128 in content of the security requirement 2, 128 is used as a protection key length in the security policy.

Second, the security policy is determined according to a more-resource-saving rule. To be specific, content that saves more resources in the content of the plurality of security requirements is used as content of the security policy.

For example, if content of each security requirement includes an encryption algorithm, and integrity protection algorithms in content of some security requirements are null, the content of the security policy includes the encryption algorithm, and does not include an integrity protection algorithm.

Third, the security policy is determined based on security requirement priorities. To be specific, if an algorithm priority is specified in a specific security requirement, the algorithm priority is used as a basis for security algorithm negotiation, a selected final algorithm is an algorithm supported by all the security requirements, and the algorithm has a highest priority and is used as content of the security policy.

Alternatively, security policy negotiation is performed primarily based on a priority of a specific security requirement. For example, if priorities of several encryption algorithms are specified in the security requirement 2, a specific encryption algorithm to be used in the security policy is determined based on the specified priorities.

Alternatively, if algorithm priorities are specified in the plurality of security requirements, an algorithm priority of a specific security requirement may be used as a primary priority. For example, a priority of the security requirement 2 is used as the primary priority.

Alternatively, the foregoing manners of determining the security policy are also applicable to a security requirement that includes only whether integrity protection is required, whether encryption is required, or whether integrity protection and encryption are required.

6. The policy control network element feeds back the security policy to the SM. Optionally, the policy control network element adds the security policy to a response message for feedback.

It should be noted that steps 1 to 3 in FIG. 2 are merely one implementation. Optionally, the SM instead of the MM may generate the network ID such as the session ID. To be specific, the SM generates the network ID such as the session ID after receiving the session request sent by the MM.

Figure 3:
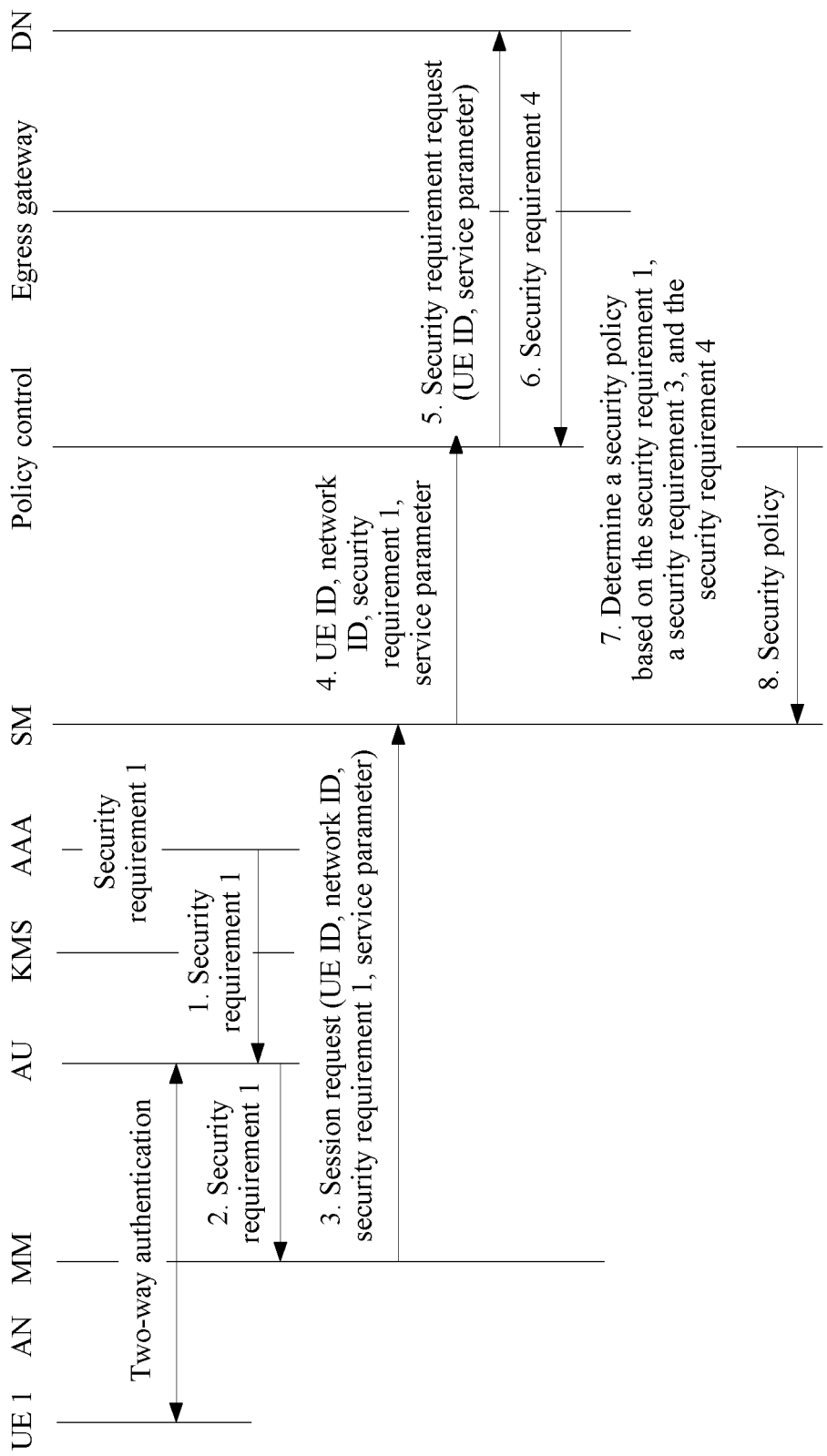
FIG. 3 is a flowchart of another security policy determining method according to an embodiment of this application.

FIG. 3 shows another security policy determining procedure. A difference from FIG. 2 is as follows: After receiving a session request, in addition to a network ID and a security requirement 1 (and probably a UE ID), an SM sends a service parameter, for example, at least one of: a service ID and an app ID, to a policy control network element. After obtaining the security requirement 1, the policy control network element sends a security requirement request to a DN server or UE 2 (not drawn in FIG. 3). The security requirement request includes at least one of: the UE ID and the service parameter (for example, the service ID or the app ID). The policy control network element receives a security requirement 4 fed back by the DN server or the UE 2. The policy control network element determines a security policy based on the security requirement 1, a security requirement 3, and the security requirement 4.

Certainly, the SM may alternatively send a security requirement request to the DN server or the UE 2, and receive a security requirement 4 fed back by the DN server or the UE 2, and then the SM sends the security requirement 4 to the policy control network element. Preferably, to simplify an interaction procedure, the SM may first obtain the security requirement 4 and then send both the security requirement 2 and the security requirement 4 to the policy control network element.

In FIG. 2 or FIG. 3, step 1 and step 2 are processes in which the SM obtains the security requirement 1 and various identities and parameters. In addition, the network element in the carrier network may further transmit the security requirement 1 and the various identities and parameters to the SM in other manners:

First Manner:

1. In a two-way authentication process, an AU obtains, from an AAA, a security requirement 1 prestored in the AAA.

2. The AU directly sends a session request to an SM without using an MM. Specific content of the session request is shown in FIG. 2 or FIG. 3. Details are not described herein again.

Second Manner:

1. An SM receives a session request sent by an AN, an AU, or an MM. The session request includes at least one of: a UE ID, a network identity, and a service parameter.

2. The SM locally obtains a prestored security requirement 1 based on the UE ID.

Third Manner:

1. An SM receives a session request sent by an AN, an AU, or an MM. The session request includes at least one of: a UE ID, a network identity, and a service parameter.

2. The SM obtains a prestored security requirement 1 from an AAA, the MM, or the AU.

In other words, alternatively, the security requirement 1 may be prestored in another network element in FIG. 1 in addition to the SM and the AAA. Because the AAA is currently configured to store subscriber registration information, prestoring the security requirement 1 in the AAA has advantages of higher security and convenience for unified management.

Alternatively, a security requirement 1 may be prestored in another network element in FIG. 1 in addition to a policy control network element. Because the policy control network element is used for QoS negotiation in an existing (for example, LTE) network architecture, prestoring the security requirement 3 in the policy control network element facilitates implementation of logic compatibility between the security policy determining solution in this embodiment and an existing policy determining procedure.

In the foregoing manners, regardless of a specific manner, for an execution manner of an HSS, refer to the procedure shown in FIG. 2, provided that obtaining of the security requirement 1 is related. Details are not described herein again.

Figure 4:
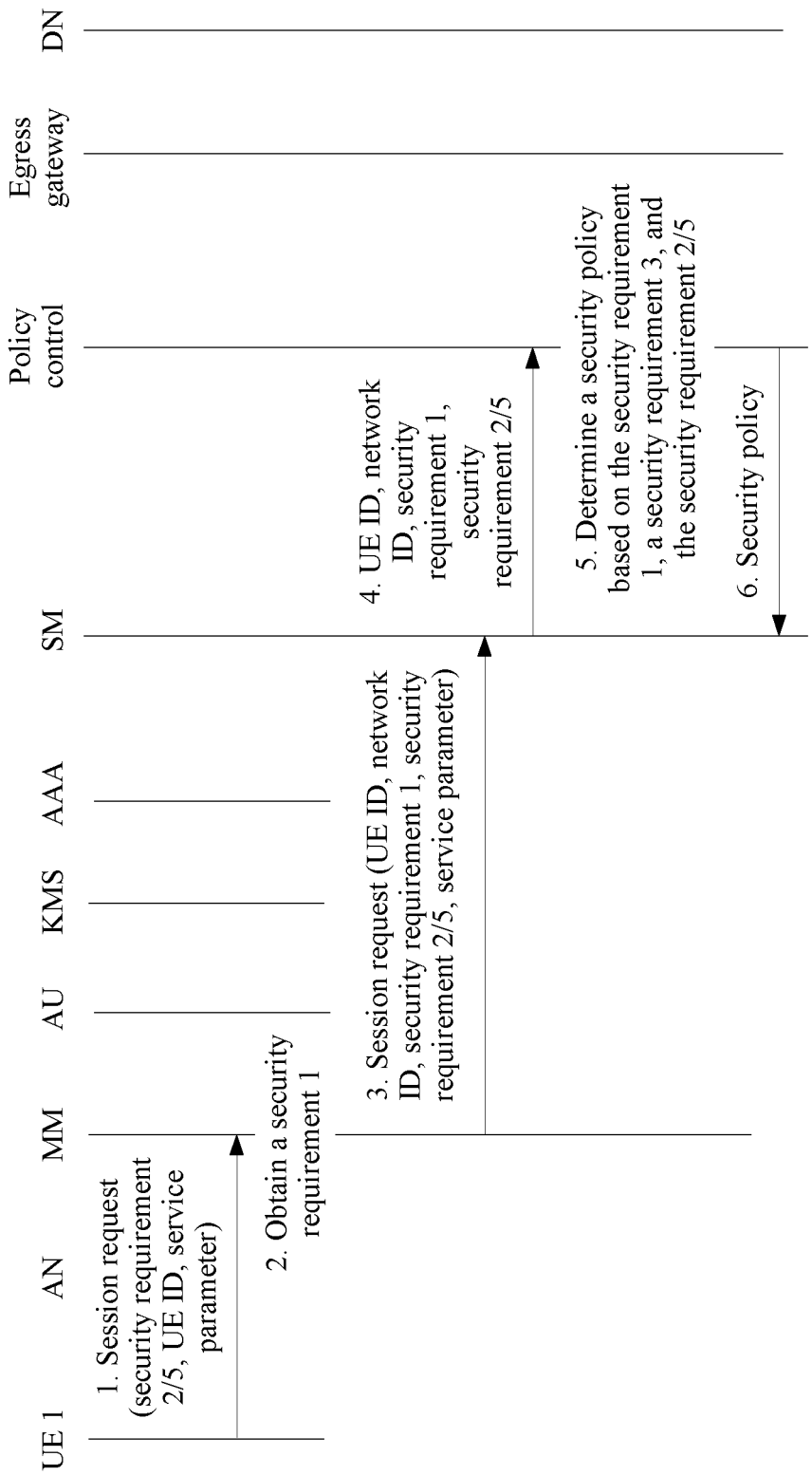
FIG. 4 is a flowchart of another security policy determining method according to an embodiment of this application.

FIG. 4 shows another security policy determining procedure. A difference from FIG. 2 or FIG. 3 is that UE 1 initiates a session request after the UE is attached to a network. In this case, the UE 1 may provide a security requirement 2 and/or a security requirement 5, so that a policy control network element determines a security policy based on more security requirements. FIG. 4 includes the following steps.

1. After being attached to the network, the UE initiates a session request to an MM. The session request includes a UE ID and a security requirement, and optionally, may further include a network ID and/or a service parameter.

Specifically, the security requirement includes a security requirement 2 and/or a security requirement 5. Specific content of the UE ID, the security requirement, the network ID, and the service parameter is the same as that described above. Details are not described herein again.

It should be noted that in the two-way authentication process shown in FIG. 2 or FIG. 3, the access request sent by the UE may also carry the security requirement 2 and/or the security requirement 5.

2. A security requirement 1 is stored in the MM. After receiving the session request, the MM generates the network ID (for example, a session ID), and the MM sends a session request to an SM. The session request includes the security requirement 1, the security requirement 2 and/or the security requirement 5, the UE ID, and the network ID, and may further include the service parameter.

3. After receiving the session request, the SM sends the security requirement 1 and the security requirement 2 and/or the security requirement 5 to the policy control network element, and may further send the UE ID and the network ID (for example, the session ID) to the policy control network element.

4. The policy control network element determines a security policy based on the security requirements sent by the SM and a locally prestored security requirement 3. A specific rule of determining the security policy is the same as that described above. Details are not described herein again.

5. The policy control network element sends the security policy to the SM.

It should be noted that steps 1 to 3 in FIG. 4 are merely one implementation. Optionally, the session request sent by the UE 1 may not include the network ID, and after receiving the session request of the UE 1, the MM generates the network ID and sends the network ID to the SM. Alternatively, the SM instead of the MM may generate the network ID. In other words, after receiving the session request sent by the MM, the SM generates the network ID, for example, the session ID.

The UE directly sends the session request to the SM. In this case, for a manner of obtaining the security requirement 1 by the SM, refer to the foregoing obtaining procedure.

For a specific manner of determining the security policy, refer to the process shown in FIG. 3. Details are not described herein again.

Figure 5:
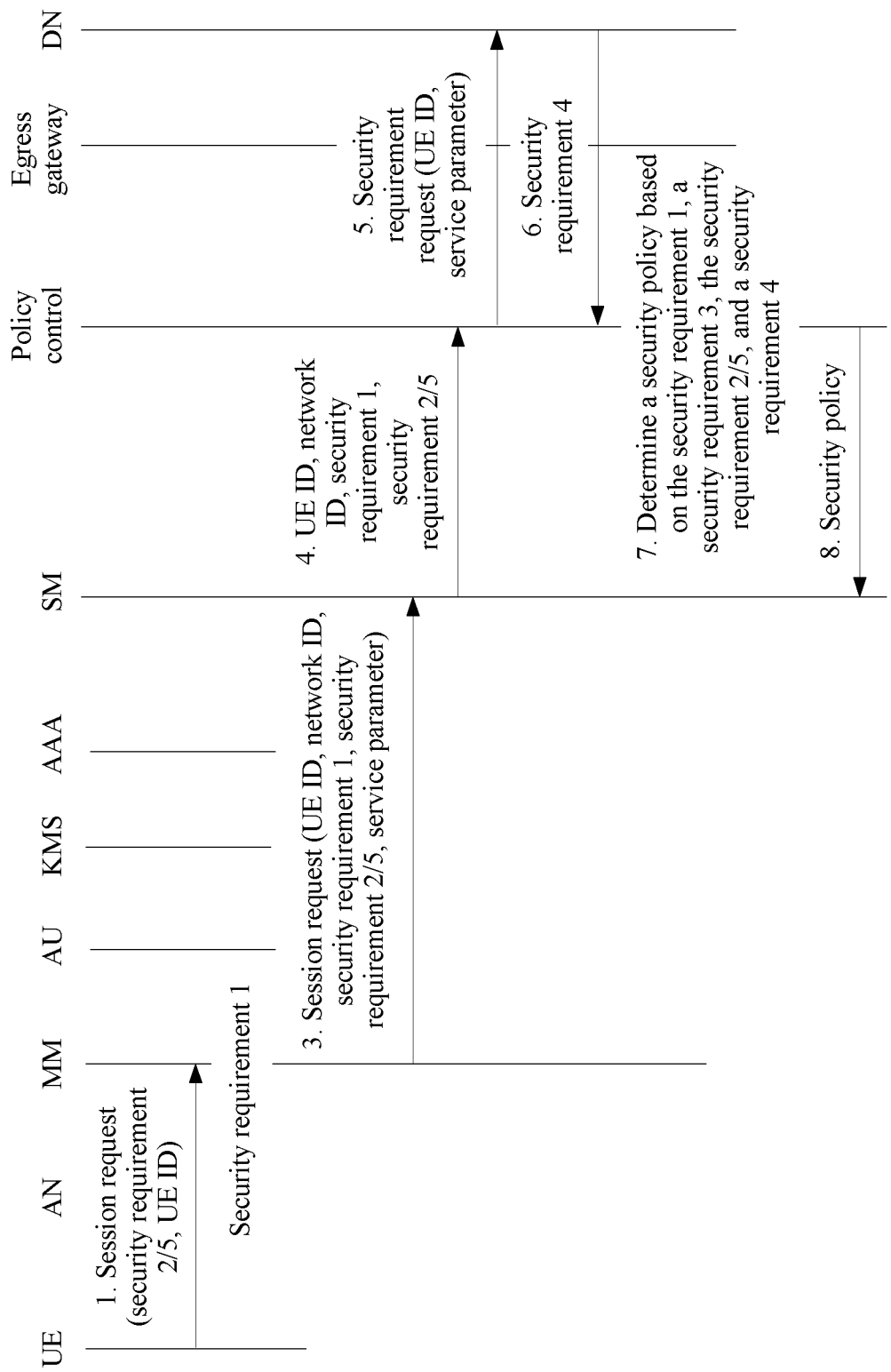
FIG. 5 is a flowchart of another security policy determining method according to an embodiment of this application.

FIG. 5 shows another security policy determining procedure. A difference from FIG. 4 is that a process of obtaining a security requirement 4 is added. Specifically, after receiving a session request, in addition to a UE ID, a network ID, and security requirements, an SM sends a service parameter, for example, at least one of: a service ID and an app ID, to a policy control network element. After obtaining the security requirements sent by the SM, the policy control network element sends a security requirement request to a DN server or UE 2. The security requirement request includes at least one of: the UE ID and the app ID. The policy control network element receives a security requirement 4 fed back by the DN server or the UE 2. The policy control network element determines a security policy based on the security requirements sent by the SM and the security requirement 4.

Certainly, alternatively, the SM may send a security requirement request to the DN server or the UE 2, and receive a security requirement 4 fed back by the DN server or the UE 2, and then the SM sends the security requirement 4 to the policy control network element. For specific manners in which the SM obtains the security requirement 4 and sends the security requirement 4 to the policy control network element, refer to FIG. 4. Details are not described herein again.

In addition to the implementation shown in FIG. 4 or FIG. 5, other implementations of obtaining the security requirement 1 by the SM may further include the following:

First Manner:

1. The SM receives a session request sent by an AN, an AU, or an MM. The session request is shown in FIG. 4 or FIG. 5.

2. The SM locally obtains a prestored security requirement 1 based on a UE ID.

Second Manner:

1. The SM receives a session request sent by an AN, an AU, or an MM. The session request is shown in FIG. 4 or FIG. 5.

2. The SM obtains a prestored security requirement 1 from an AAA, the MM, or the AU.

All the foregoing examples are procedures in which the policy control network element determines a security policy based on security requirements. The security policy determining module may be disposed in the SM in addition to the policy control network element.

Figure 6:
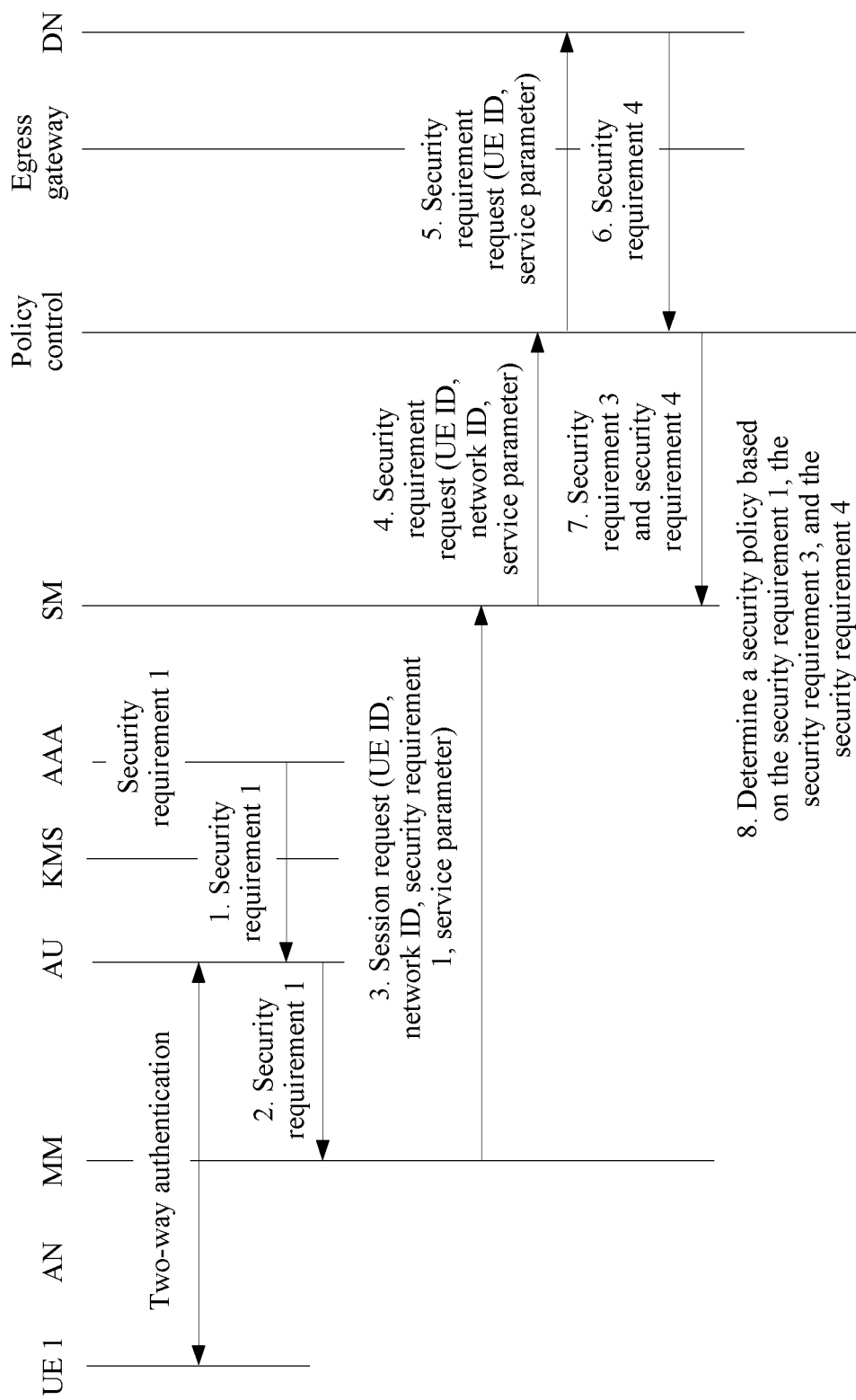
FIG. 6 is a flowchart of another security policy determining method according to an embodiment of this application.
Figure 7:
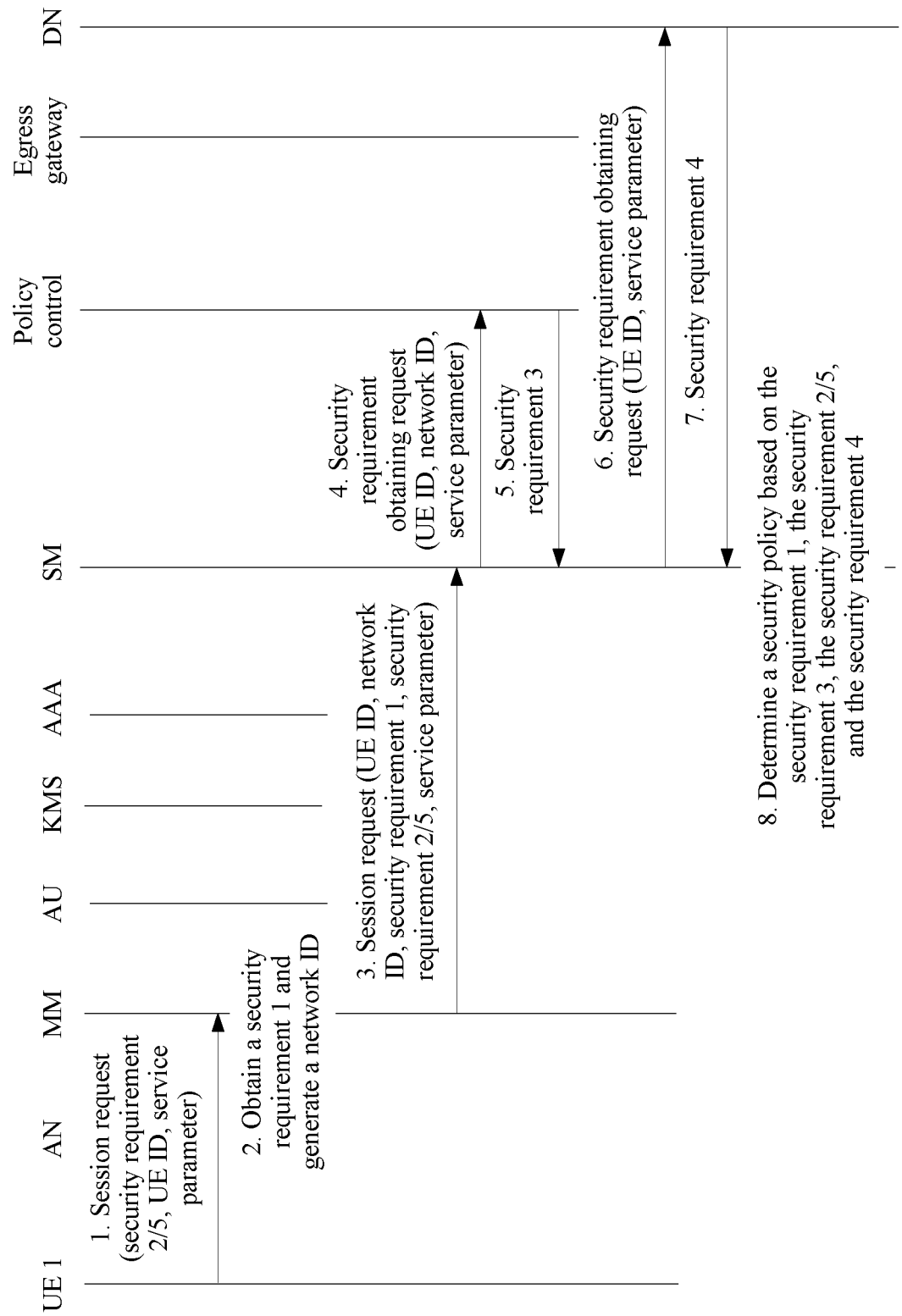
FIG. 7 is a flowchart of another security policy determining method according to an embodiment of this application.

When the SM determines a security policy based on security requirements, for processes in which the SM obtains a security requirement 1, a security requirement 2 and/or 5, a UE ID, a network ID, and a service parameter, refer to FIG. 2 to FIG. 5. Details are not described herein again. The SM may obtain a security requirement 4 in the manners shown in FIG. 2 to FIG. 5. Alternatively, the policy control network element obtains a security requirement 4 in the manners shown in FIG. 2 to FIG. 5, and then the SM receives the security requirement 4 sent by the policy control network element. The SM may send a security requirement request (including at least one of: the UE ID, the network ID, or the service parameter) to the policy control network element, to obtain a security requirement 3 from the policy control network element. FIG. 6 and FIG. 7 are merely examples in which the SM determines the security policy. Not all cases are illustrated herein.

In the foregoing examples, both the policy control network element and the SM determine the security policy based on at least two security requirements. Apart from the foregoing examples, a security policy may alternatively be determined based on one security requirement. To be specific, at least one security requirement is received, and the security policy is determined by using only some of the security requirement; or at least one security requirement is received, and the security policy is determined by using all received security requirements. This is not limited in this embodiment of this application.

In the foregoing procedures, the session ID, the bearer ID, the flow ID, or the slice ID in the network ID is generated by the network element in the carrier network, for example, the AN, the MM, the AU, the KMS, the AAA, the SM, or the policy control network element. In addition, the session ID, the bearer ID, the flow ID, or the slice ID may alternatively be generated by the UE 1, carried in an attachment request or a session request sent by the UE 1 to the carrier network, and sent to the network element in the carrier network, for example, the AN, the MM, the AU, the KMS, the AAA, the SM, or the policy control network element. For example, in FIG. 2, before two-way authentication, the UE 1 sends, to the carrier network, an attachment request message that carries the session ID, the bearer ID, the flow ID, or the slice ID (this belongs to a process in which the UE 1 is attached to the carrier network). For another example, in FIG. 4, the session request sent by the UE 1 to the MM further carries the session ID, the bearer ID, the flow ID, or the slice ID.

When the UE 1 generates and sends the session ID, the bearer ID, the flow flow ID, or the slice ID to the carrier network, the network element in the carrier network, for example, the AN, the MM, the AU, the KMS, the AAA, the SM, or the policy control network element, no longer generates a session ID, a bearer ID, a flow flow ID, or a slice ID.

The foregoing descriptions are merely examples. For how another network element implements the function of determining a security policy, refer to the foregoing drawings and perform adaptive adjustment. Details are not described herein.

A specific working process of a key configuration module is described below.

The key configuration module may be disposed in one or more of UE 1, a network element (for example, an AN, an MM, an AU, a KMS, an AAA, an SM, or a policy control network element) in a carrier network, a gateway, a network element (for example, a DN server) in a DN, or UE 2. A generation party of a protection key needs to obtain a security policy and a shared key K to calculate the protection key, and distribute the protection key to other network elements such as the UE and the gateway (or the DN server or the UE 2). Specifically, the generation party of the protection key may send the protection key to the KMS, and the KMS sends the protection key to the other network elements such as the UE and the gateway (or the DN server or the UE 2); or may directly distribute the protection key to the other network elements such as the UE and the gateway (or the DN server or the UE 2).

An example in which the key configuration module is disposed in one or more of the SM, the KMS, or the UE is used below for description.

Figure 8:
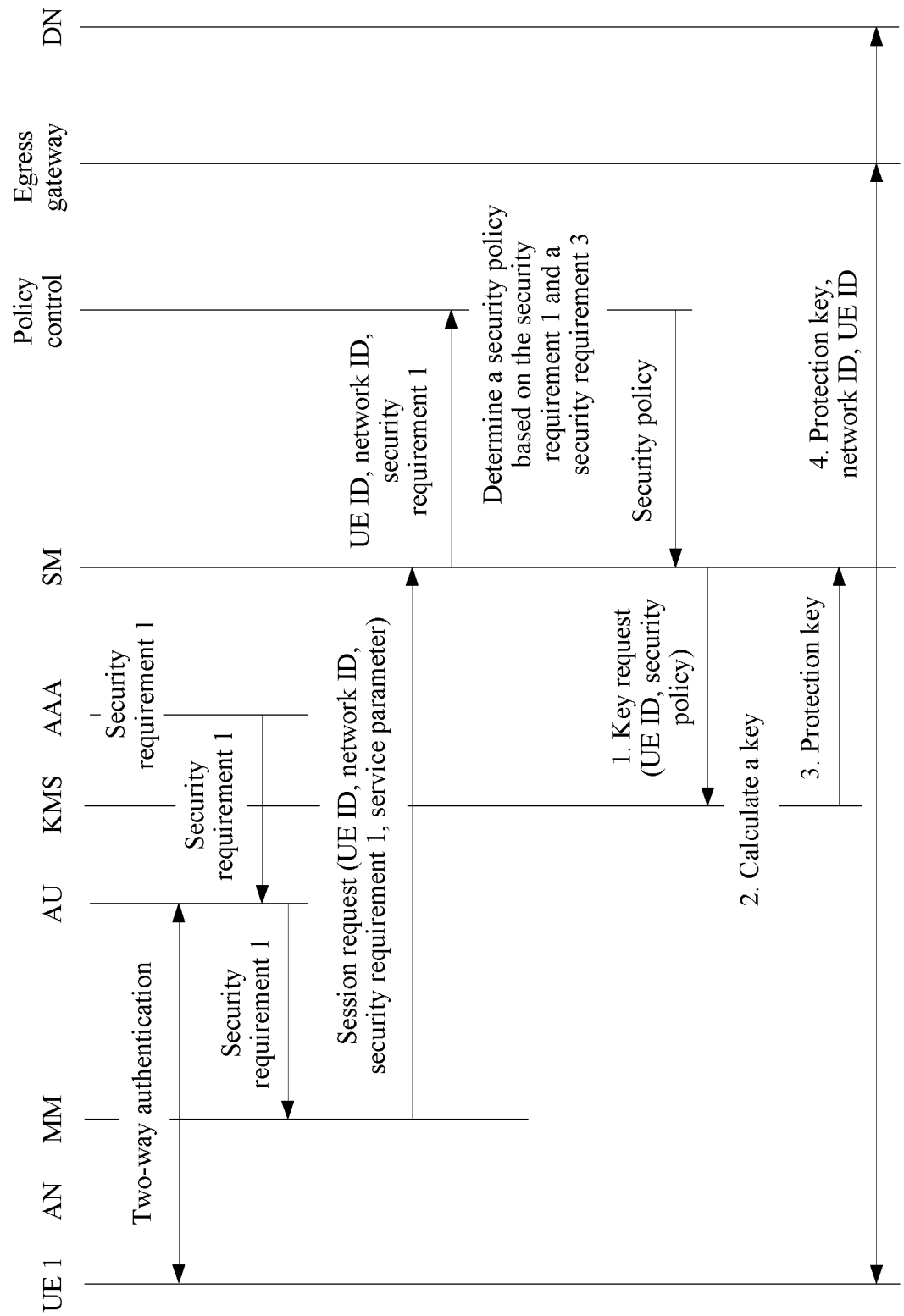
FIG. 8 is a flowchart of a key configuration method according to an embodiment of this application.

FIG. 8 specifically includes the following steps.

1. An SM sends a key request message to a KMS. The key request message includes a UE ID and a security policy, and optionally, may further include a network ID and/or a service parameter. Specific content of the UE ID, the security policy, the network ID, and the service parameter is the same as that described above. Details are not described herein again.

For a manner of obtaining the security policy, refer to FIG. 2 to FIG. 7. If the security policy is determined by a policy control network element, the policy control network element sends the security policy to the SM.

2. The KMS calculates a protection key based on the security policy and a shared key K. The protection key is used to protect a session between UE and a gateway (or a DN server or UE 2).

The shared key K between the KMS and the UE may be allocated to the UE and the KMS in a process in which the UE accesses a network and sets up a context to an MM, or may be allocated to the UE and the KMS in a two-way authentication process or after a two-way authentication process, or may be preconfigured on the UE and the KMS.

Specifically, because content of the security policy may include at least one of: an encryption algorithm and an integrity protection algorithm, one protection key may be calculated based on the security policy and may be used for encryption and/or integrity protection, or an encryption protection key and an integrity protection key may be separately calculated.

The protection key is as follows:

$K_{SID}$=KDF (K, (at least one of: a UE ID, a session ID, a bearer ID, a flow ID, a slice ID, a PLMN ID, a service parameter, and a nonce), a policy set); or $K_{SID}$=KDF (K, (at least one of: a UE ID, a session ID, a bearer ID, a flow ID, a slice ID, a PLMN ID, a service parameter, and a nonce)); or $K_{SID\_enc}$=KDF ($K_{SID}$, an encryption algorithm ID, (at least one of: a UE ID, a session ID, a bearer ID, a flow ID, a slice ID, a PLMN ID, a service parameter, and a nonce)); or $K_{SID\_enc}$=KDF ($K_{SID}$, an encryption identity, (at least one of: a UE ID, a session ID, a bearer ID, a flow ID, a slice ID, a PLMN ID, a service parameter, and a nonce)); or $K_{SID\_enc}$=KDF ($K_{SID}$, an encryption algorithm ID).

The policy set is the security policy, and K is the shared key between the UE and the KMS.

As described above, the encryption identity may be a character string and be used to identify that a derivation result is an encryption key. The nonce is a random parameter and may be selected by the KMS, or be added to a session request by the UE. A purpose of using a random number for calculation is to improve key security and randomness.

The integrity protection key $K_{SID\_int}$ is as follows:

$K_{SID\_int}$=KDF ($K_{SID}$, an integrity protection algorithm ID); or $K_{SID\_enc}$=KDF ($K_{SID}$, an integrity protection identity, (at least one of: a UE ID, a session ID, a bearer ID, a flow ID, a slice ID, a PLMN ID, a service parameter, and a nonce)); or $K_{SID\_int}$=KDF ($K_{SID}$, an integrity protection algorithm ID, (at least one of: a UE ID, a session ID, a bearer ID, a flow ID, a slice ID, a PLMN ID, a service parameter, and a nonce)).

The integrity protection identity may be a character string and be used to identify that a derivation result is an integrity protection key.

The foregoing KDF is a key derivation function, and includes but is not limited to the following key derivation functions: HMAC (such as HMAC-SHA256 and HMAC-SHA1), NMAC, CMAC, OMAC, CBC-MAC, PMAC, UMAC, VMAC, a hash algorithm, and the like. In addition, requirements in security policies are different, for example, a protection key length is required to be 256 bits in a security policy 1, and a protection key length is required to be 128 bits in a security policy 2. Therefore, the KMS may use different key derivation algorithms to meet requirements for different protection key lengths in different security policies (for example, HMAC-SHA1 is used to generate a 128-bit protection key, and HMAC-SHA256 is used to generate a 256-bit protection key). In addition, the KMS may generate a protection key by using only one algorithm and then generate a protection key of another length through truncating (truncate), prolonging, or the like. Manners in which the KMS processes the protection key length include but are not limited to the foregoing processing manners.

All the foregoing used parameters such as the bearer ID, the flow ID, the slice ID, the encryption algorithm ID, and the session ID may be carried in the session request sent by the UE, together with the foregoing security requirement 2 and/or security requirement 5.

3. The KMS sends the protection key, which may further include the UE ID and/or the network ID, to the SM.

4. The SM distributes the protection key, the network ID, and the UE ID to the gateway (or the DN server or the UE 2) and the UE 1. Specifically, the SM may add the protection key to a user plane setup (User Plane Setup) message and send the user plane setup message to the gateway (or the server or the UE 2), and add the protection key to a session setup complete Session Setup Complete message and send the session setup complete message to the UE.

Alternatively, the KMS may directly send the network ID and the protection key to the gateway (or the DN server or the UE 2). A sent message may further include the UE ID.

If a nonce is included in derivation of the protection key, the KMS also sends the nonce to the SM and then the SM sends the nonce to the UE, or the KMS directly sends the nonce to the UE.

Figure 9:
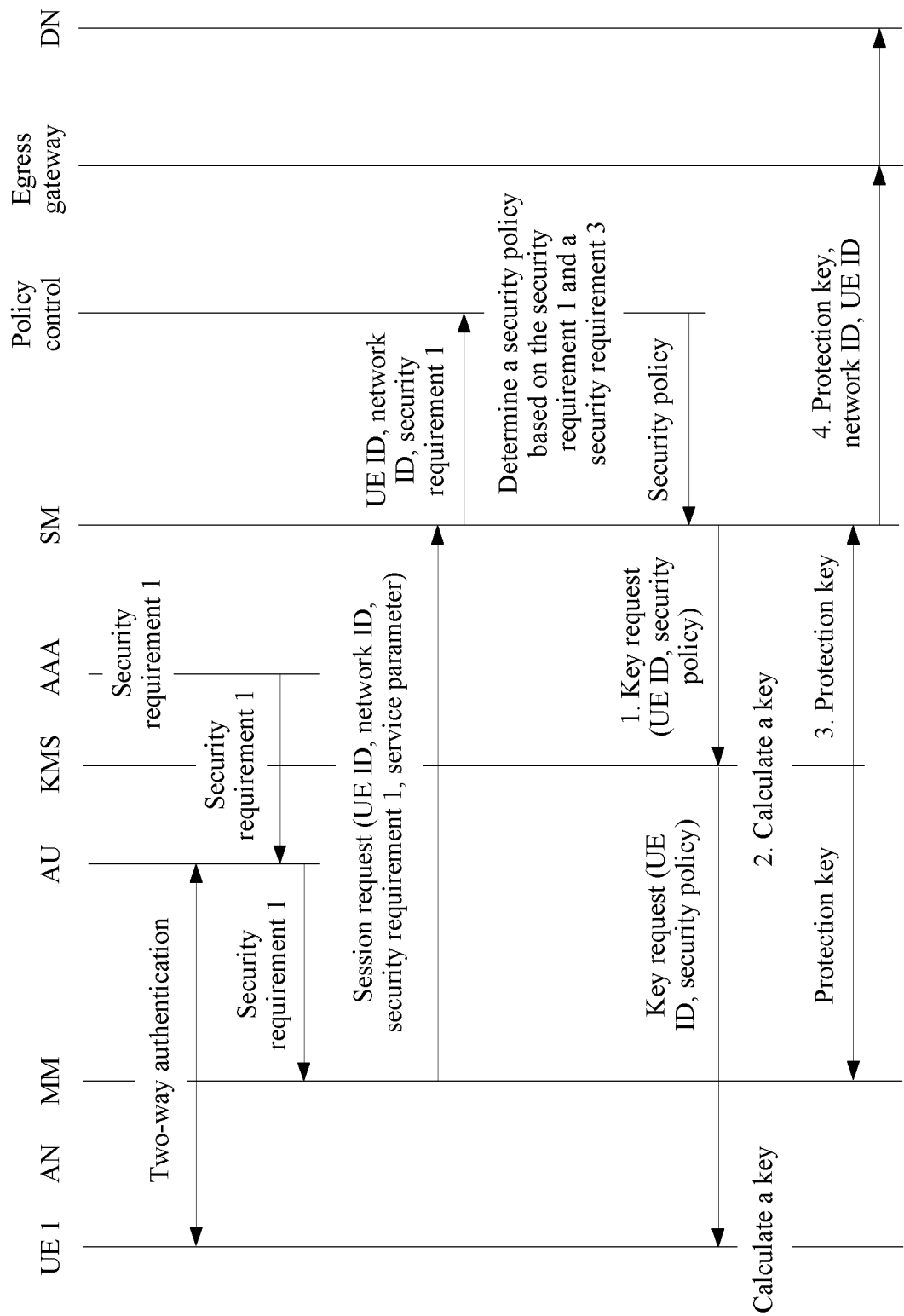
FIG. 9 is a flowchart of another key configuration method according to an embodiment of this application.

FIG. 9 differs from FIG. 8 in that UE receives a security policy from an SM, and calculates a protection key based on the security policy. If the UE needs to use a random parameter when calculating the protection key, the random parameter may be sent by a KMS to the UE, or may be generated by the UE.

Alternatively, the KMS may send the protection key to an MM. Specifically, the MM may request a session protection key from the KMS after sending a session request to the SM and receiving a session response sent by the SM.

Alternatively, a shared key K may be prestored on the SM; or the KMS obtains a shared key K after two-way authentication is performed between the UE and the AU, and then KMS sends the shared key K to the SM. Both the UE and the SM calculate the protection key.

Figure 10:
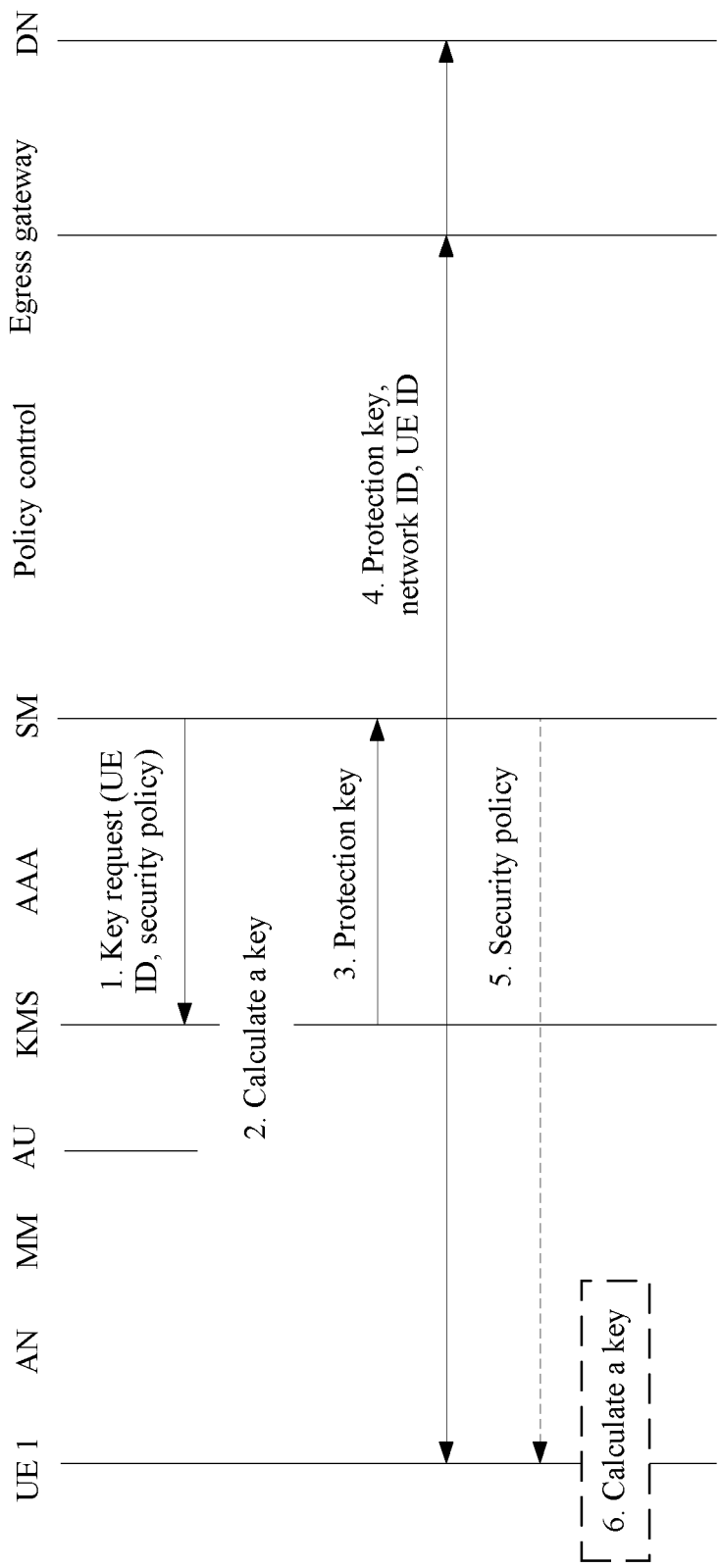
FIG. 10 is a flowchart of another key configuration method according to an embodiment of this application.

FIG. 10 shows another key allocation method according to an embodiment of this application. The method includes the following steps.

1. An SM sends a key request message to a KMS. The key request message includes a UE ID and a security policy, and optionally, may further include a network ID and/or a service parameter. Specific content of the UE ID, the security requirement, the network ID, and the service parameter is the same as that described above. Details are not described herein again.

For a manner of obtaining the security policy, refer to FIG. 2 to FIG. 7. If the security policy is determined by a policy control network element, the policy control network element sends the security policy to the SM.

2. The KMS calculates a first key based on the security policy and a shared key K. The first key is used to protect a session between UE and a gateway (or a server (including a server in a DN or a carrier network, briefly referred to as the server below), or a controller (including a controller in the DN or the carrier network, briefly referred to as the controller below), or UE 2).

The shared key K between the KMS and the UE may be allocated to the UE and the KMS in a process in which the UE accesses a network and sets up a context to an MM, or may be allocated to the UE and the KMS in a two-way authentication process or after a two-way authentication process, or may be preconfigured on the UE and the KMS.

Specifically, because content of the security policy may include at least one of: an encryption algorithm and an integrity protection algorithm, one first key may be calculated based on the security policy and may be used for encryption and/or integrity protection, or an encryption protection key and an integrity protection key may be separately calculated. There are a plurality of manners of calculating the first key based on the security policy and the shared key K, including but not limited to the following manners:

The first key (to be specific, the first key is the protection key in the foregoing embodiment and is uniformly referred to as the protection key below for uniformity with the foregoing embodiment) is as follows:

$K_{SID}$=KDF (K, (at least one of: a UE ID, a session ID, a bearer ID, a flow ID, a slice ID, a PLMN ID, a service parameter, and a nonce), a policy set); or $K_{SID}$=KDF (K, (at least one of: a UE ID, a session ID, a bearer ID, a flow ID, a slice ID, a PLMN ID, a service parameter, and a nonce)).

The encryption protection key $K_{SID\_enc}$ is as follows:

$K_{SID\_enc}$=KDF (K, (at least one of: an encryption algorithm ID, a UE ID, a session ID, a bearer ID, a flow ID, a slice ID, a PLMN ID, a service parameter, a nonce, and a policy set)); or $K_{SID\_enc}$=KDF (K, (at least one of: an encryption identity, a UE ID, a session ID, a bearer ID, a flow ID, a slice ID, a PLMN ID, a service parameter, a nonce, and a policy set)).

The policy set is the security policy, and K is the shared key between the UE and the KMS. A definition of the UE ID is the same as that described in the foregoing embodiments.

As described above, the encryption identity may be a character string and be used to identify that a derivation result is an encryption key. The nonce is a random parameter and may be selected by the KMS, or be added to a session request by the UE. A purpose of using a random number for calculation is to improve key security and randomness. Alternatively, at least one of: two nonces may be included in key derivation. One nonce is from the KMS (selected by the KMS and directly sent to the UE, or sent by the SM to the UE), and the other nonce is from the UE (added to a session request by the UE).

The integrity protection key $K_{SID\_int}$ is as follows:

$K_{SID\_int}$=KDF (K, (at least one of: an integrity protection identity, a UE ID, a session ID, a bearer ID, a flow ID, a slice ID, a PLMN ID, a service parameter, a nonce, and a policy set)); or $K_{SID\_int}$=KDF (K, (at least one of: an integrity protection algorithm ID, a UE ID, a session ID, a bearer ID, a flow ID, a slice ID, a PLMN ID, a service parameter, a nonce, and a policy set)).

The integrity protection identity may be a character string and be used to identify that a derivation result is an integrity protection key. The nonce is a random parameter and may be selected by the KMS, or be added to a session request by the UE. A purpose of using a random number for calculation is to improve key security and randomness. Alternatively, at least one of: two nonces may be included in key derivation. One nonce is from the KMS (selected by the KMS and directly sent to the UE, or sent by the SM to the UE), and the other nonce is from the UE (added to a session request by the UE).

The foregoing used parameters such as the bearer ID, the flow ID, the slice ID, and the session ID may be carried in the session request sent by the UE, together with the foregoing security requirement 2 and/or security requirement 5, or be carried in a request of the UE for accessing the carrier network for a first time, or be carried in the key request message. In addition, the encryption algorithm ID and the integrity protection algorithm ID may be content of the security policy.

3. The KMS sends, to the SM, the key (to be specific, at least one of: the protection key $K_{SID}$, the encryption protection key $K_{SID\_enc}$, and the integrity protection key $K_{SID\_int}$) obtained in step 2, and probably the UE ID and/or the network ID.

4. The SM distributes, to the gateway (or the server, or the controller, or the UE 2) and the UE 1, the key (to be specific, at least one of: the protection key $K_{SID}$, the encryption protection key $K_{SID\_enc}$, and the integrity protection key $K_{SID\_int}$) obtained in step 2. The message may further include at least one of: the network ID, the UE ID, and the security policy. Specifically, the SM may add the protection key to a user plane setup (User Plane Setup) message and send the user plane setup message to the gateway (or the server, or the controller, or the UE 2).

Alternatively, in step 4, the SM does not send, to the UE, the key obtained in step 2, but continues to perform the following steps.

5. The SM sends the security policy to the UE. The message may further include at least one of: the network ID and the UE ID.

6. The UE receives the security policy from the SM (or the policy control or the KMS), and calculates at least one of: the $K_{SID}$, the encryption protection key $K_{SID\_enc}$, and the integrity protection key $K_{SID\_int}$ based on the security policy in a manner the same as the foregoing manners. If the UE needs to use a random parameter when calculating the protection key, the random parameter may be sent by the KMS to the UE, or may be generated by the UE. Alternatively, at least one of: two nonces may be included in key derivation. One nonce is from the KMS (selected by the KMS and directly sent to the UE, or sent by the SM to the UE), and the other nonce is from the UE (added to the session request by the UE).

That the UE generates or obtains, from the SM, at least one of: the protection key $K_{SID}$, the encryption protection key $K_{SID\_enc}$, and the integrity protection key is disclosed above. In addition, the UE may receive, from the KMS (or the policy control network element), the security policy and at least one of: the protection key $K_{SID}$, the encryption protection key $K_{SID\_enc}$, and the integrity protection key.

Figure 11:
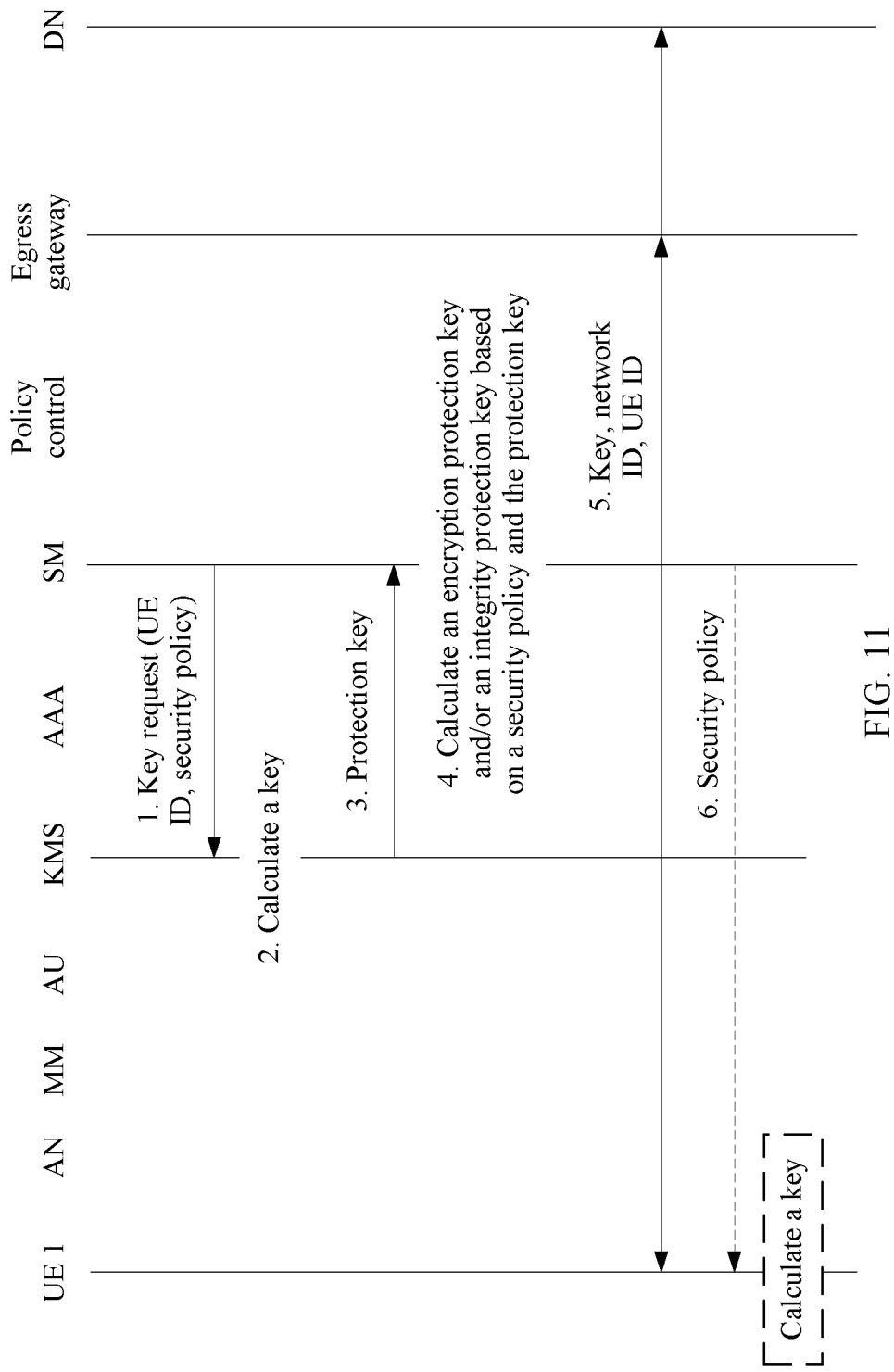
FIG. 11 is a flowchart of another key configuration method according to an embodiment of this application.

FIG. 11 shows another key configuration method according to an embodiment of this application. The method includes the following steps.

1. An SM sends a key request message to a KMS. The key request message includes a UE ID and a security policy, and optionally, may further include a network ID and/or a service parameter. Specific content of the UE ID, the security requirement, the network ID, and the service parameter is the same as that described above. Details are not described herein again.

For a manner of obtaining the security policy, refer to FIG. 2 to FIG. 7. If the security policy is determined by a policy control network element, the policy control network element sends the security policy to the SM.

2. The KMS calculates a protection key based on the security policy and a shared key K. The protection key is used to protect a session between UE and a gateway (or a server, or a controller, or UE 2).

The shared key K between the KMS and the UE may be allocated to the UE and the KMS in a process in which the UE accesses a network and sets up a context to an MM, or may be allocated to the UE and the KMS in a two-way authentication process or after a two-way authentication process, or may be preconfigured on the UE and the KMS.

Specifically, because content of the security policy may include at least one of: an encryption algorithm and an integrity protection algorithm, one protection key may be calculated based on the security policy and may be used for encryption and/or integrity protection, or an encryption protection key and an integrity protection key may be separately calculated. There are a plurality of manners of calculating the protection key based on the security policy and the shared key K, including but not limited to the following manners:

The protection key is as follows:

$K_{SID}$=KDF (K, (at least one of: a UE ID, a session ID, a bearer ID, a flow ID, a slice ID, a PLMN ID, a service parameter, and a nonce), a policy set); or $K_{SID}$=KDF (K, (at least one of: a UE ID, a session ID, a bearer ID, a flow ID, a slice ID, a PLMN ID, a service parameter, and a nonce)).

The foregoing used parameters such as the bearer ID, the flow ID, the slice ID, an encryption algorithm ID, and the session ID may be carried in a session request sent by the UE, together with the foregoing security requirement 2 and/or security requirement 5, or be carried in a request of the UE for accessing a carrier network for a first time, or be carried in the key request message. In addition, the encryption algorithm ID and an integrity protection algorithm ID may be content of the security policy. The nonce is a random parameter and may be selected by the KMS, or be added to the session request by the UE. A purpose of using a random number for calculation is to improve key security and randomness. Alternatively, at least one of: two nonces may be included in key derivation. One nonce is from the KMS (selected by the KMS and directly sent to the UE, or sent by the SM to the UE), and the other nonce is from the UE (added to the session request by the UE).

3. The KMS sends the protection key $K_{SID}$, which may further include the UE ID and/or the network ID, to the SM.

4. The SM calculates an encryption protection key and/or an integrity protection key based on the security policy and the $K_{SID}$. Calculation manners include but are not limited to the following manners:

The encryption protection key $K_{SID\_enc}$ as follows:

$K_{SID\_enc}$=KDF ($K_{SID}$, (at least one of: is an encryption algorithm ID, a UE ID, a session ID, a bearer ID, a flow ID, a slice ID, a PLMN ID, a service parameter, a nonce, and a policy set)); or $K_{SID\_enc}$=KDF ($K_{SID}$, (at least one of: an encryption identity, a UE ID, a session ID, a bearer ID, a flow ID, a slice ID, a PLMN ID, a service parameter, a nonce, and a policy set)).

The policy set is the security policy, and K is the shared key between the UE and the KMS. The UE ID is the same as that described above. The encryption identity may be a character string and be used to identify that a derivation result is an encryption key. The nonce is a random parameter and may be selected by the KMS, or be added to a session request by the UE. A purpose of using a random number for calculation is to improve key security and randomness. Alternatively, at least one of: two nonces may be included in key derivation. One nonce is from the KMS (selected by the KMS and directly sent to the UE, or sent by the SM to the UE), and the other nonce is from the UE (added to a session request by the UE).

The integrity protection key $K_{SID\_int}$ is as follows:

$K_{SID\_int}$=KDF ($K_{SID}$, (at least one of: an integrity protection identity, a UE ID, a session ID, a bearer ID, a flow ID, a slice ID, a PLMN ID, a service parameter, a nonce, and a policy set)); or $K_{SID\_int}$=KDF ($K_{SID}$, (at least one of: an integrity protection algorithm ID, a UE ID, a session ID, a bearer ID, a flow ID, a slice ID, a PLMN ID, a service parameter, a nonce, and a policy set)).

The integrity protection identity may be a character string and be used to identify that a derivation result is an integrity protection key. The nonce is a random parameter and may be selected by the KMS, or be added to a session request by the UE. A purpose of using a random number for calculation is to improve key security and randomness. Alternatively, at least one of: two nonces may be included in key derivation. One nonce is from the KMS (selected by the KMS and directly sent to the UE, or sent by the SM to the UE), and the other nonce is from the UE (added to a session request by the UE).

The foregoing used parameters such as the bearer ID, the flow ID, the slice ID, and the session ID may be carried in the session request sent by the UE, together with the foregoing security requirement 2 and/or security requirement 5, or be carried in a request of the UE for accessing the carrier network for a first time, or be carried in the key request message. In addition, the encryption algorithm ID and the integrity protection algorithm ID may be content of the security policy.

5. The SM distributes, to the gateway (or the server, or the controller, or the UE 2) and the UE 1, the key (to be specific, at least one of: the encryption protection key $K_{SID\_enc}$ and the integrity protection key $K_{SID\_int}$) obtained in step 4. The message may further include at least one of: the network ID, the UE ID, and the security policy. Specifically, the SM may add the protection key to a user plane setup (User Plane Setup) message and send the user plane setup message to the gateway (or the server, or the controller, or the UE 2), and add the protection key to a session setup complete Session Setup Complete message and send the session setup complete message to the UE.

Further, in step 5, the SM may not send, to the UE, the key obtained in step 4, but performs any one of the following two procedures:

In a first possible procedure, the SM sends the security policy to the UE. The message may further include at least one of: the network ID and the UE ID. The UE receives the security policy from the SM (or the policy control or the KMS), and calculates a protection key based on the security policy in a manner same as that in the foregoing embodiments. If the UE needs to use a random parameter when calculating the protection key, the random parameter may be sent by the KMS to the UE, or may be generated by the UE. Alternatively, at least one of: two nonces may be included in key derivation. One nonce is from the KMS (selected by the KMS and directly sent to the UE, or sent by the SM to the UE), and the other nonce is from the UE (added to the session request by the UE).

In a second possible procedure, the SM sends the KSID and the security policy to the UE, and the UE receives the KSID and the security policy from the SM (or the policy control or the KMS) and calculates the protection key based on the security policy in a manner the same as that in the foregoing embodiments. If the UE needs to use a random parameter when calculating the protection key, the random parameter may be sent by the KMS to the UE, or may be generated by the UE. Alternatively, at least one of: two nonces may be included in key derivation. One nonce is from the KMS (selected by the KMS and directly sent to the UE, or sent by the SM to the UE), and the other nonce is from the UE (added to the session request by the UE).

That the UE generates or obtains, from the SM, at least one of: the protection key $K_{SID}$, the encryption protection key $K_{SID\_enc}$, and the integrity protection key $K_{SID\_int}$ is disclosed above. In addition, the UE may receive, from the KMS (or the policy control network element), the security policy and at least one of: the protection key Km, the encryption protection key $K_{SID\_enc}$, and the integrity protection key.

It can be learned from the foregoing process that FIG. 11 differs from FIG. 8 to FIG. 10 in that after obtaining the $K_{SID}$ through derivation, the KMS sends the Km to the SM, and then the SM obtains the encryption protection key $K_{SID\_enc}$ and/or the integrity protection key $K_{SID\_int}$ through derivation based on the $K_{SID}$, and sends the encryption protection key $K_{SID\_enc}$ and/or the integrity protection key $K_{SID\_int}$ to two ends of end-to-end communication. In other words, two different network element devices each perform one key derivation.

Figure 12:
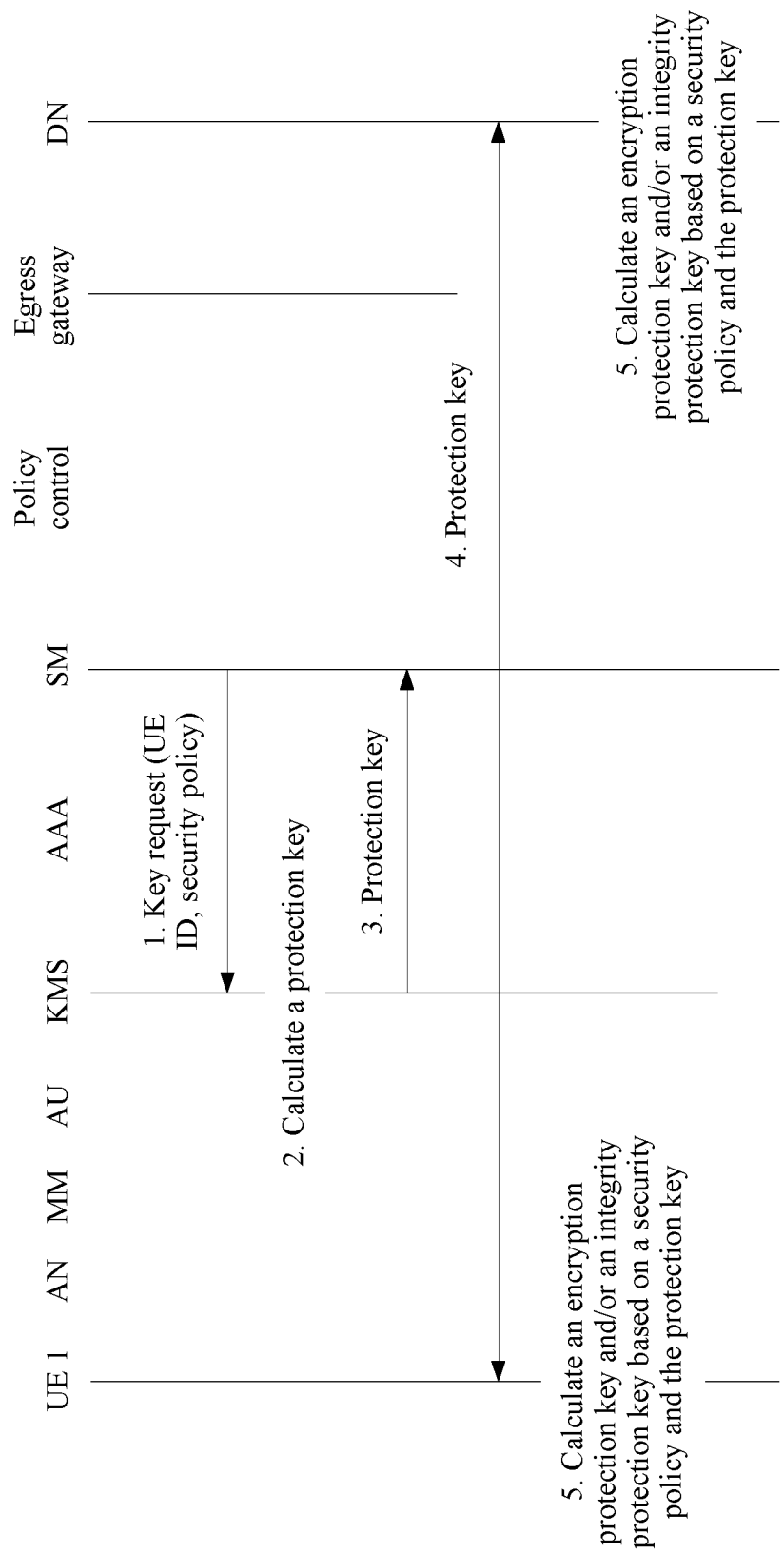
FIG. 12 is a flowchart of another key configuration method according to an embodiment of this application.

FIG. 12 differs from FIG. 11 in that after obtaining $K_{SID}$ through derivation, a KMS sends the $K_{SID}$ to an SM, the SM then sends the $K_{SID}$ to a gateway (or a server, or a controller, or UE 2) and UE, and the gateway (or the server, or the controller, or the UE 2) and the UE 1 obtain an encryption protection key $K_{SID\_enc}$ and/or an integrity protection key $K_{SID\_int}$ through derivation based on the $K_{SID}$.

Alternatively, the SM may obtain an encryption protection key $K_{SID\_enc}$ and/or an integrity protection key $K_{SID\_int}$ through derivation based on the $K_{SID}$, and sends the $K_{SID\_enc}$ and the $K_{SID\_int}$ to the UE.

Alternatively, the SM may send only a security policy to the UE, and the UE obtains an encryption protection key $K_{SID\_enc}$ and/or an integrity protection key $K_{SID\_int}$ through derivation based on the security policy.

For a transfer formula and a derivation formula of another parameter in a message, refer to the embodiment corresponding to FIG. 11. The foregoing message may include at least one of: the security policy, a network ID, and a UE ID.

Figure 13:
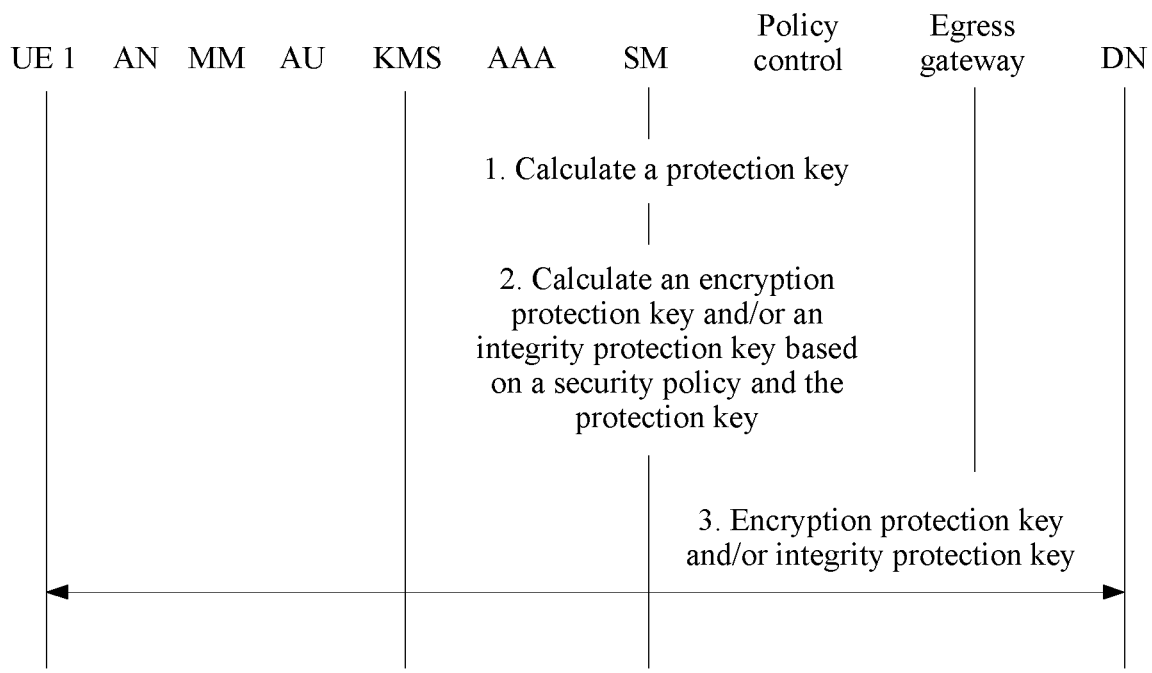
FIG. 13 is a flowchart of another key configuration method according to an embodiment of this application.

FIG. 13 differs from FIG. 11 in that an SM stores a shared key, obtains $K_{SID}$ through derivation, and then obtains an encryption protection key $K_{SID\_enc}$ and/or an integrity protection key $K_{SID\_int}$ through derivation based on the $K_{SID}$, and sends the encryption protection key $K_{SID\_enc}$ and/or the integrity protection key $K_{SID\_int}$ to a gateway (or a server, or a controller, or UE 2) and UE.

Alternatively, the SM may send the $K_{SID}$ and a security policy to the UE, and the UE obtains an encryption protection key $K_{SID\_enc}$ and/or an integrity protection key $K_{SID\_int}$ through derivation.

Alternatively, the SM may send only a security policy to the UE, and the UE obtains an encryption protection key $K_{SID\_enc}$ and/or an integrity protection key $K_{SID\_int}$ through derivation based on the security policy.

For a transfer formula and a derivation formula of another parameter in a message, refer to FIG. 11. The foregoing message includes at least one of: the security policy, a network ID, and a UE ID.

Figure 14:
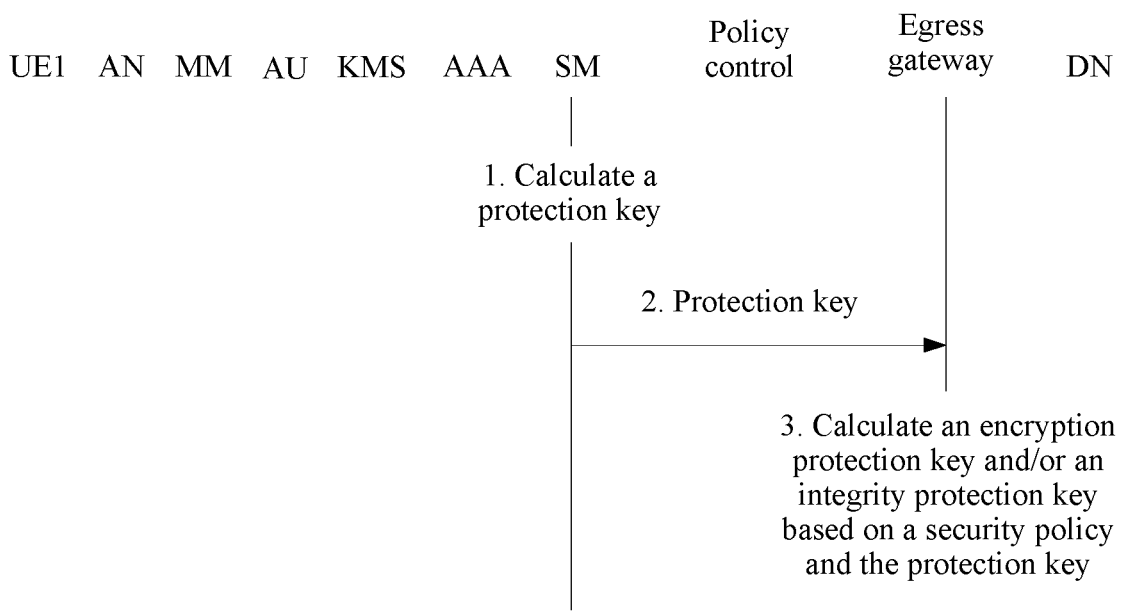
FIG. 14 is a flowchart of another key configuration method according to an embodiment of this application.

FIG. 14 differs from FIG. 11 in that after obtaining $K_{SID}$ through derivation, an SM sends the $K_{SID}$ to a gateway (or a server, or a controller, or UE 2) and UE, and then the gateway (or the server, or the controller, or the UE 2) and the UE obtain an encryption protection key $K_{SID\_enc}$ and/or an integrity protection key $K_{SID\_int}$ through derivation based on the $K_{SID}$.

Alternatively, the SM may obtain an encryption protection key $K_{SID\_enc}$ and/or an integrity protection key $K_{SID\_int}$ through derivation based on the Km, and sends the $K_{SID\_enc}$ and the $K_{SID\_int}$ to the UE.

Alternatively, the SM may send only a security policy to the UE, and the UE obtains an encryption protection key $K_{SID\_enc}$ and/or an integrity protection key $K_{SID\_int}$ through derivation based on the security policy.

For a transfer formula and a derivation formula of another parameter in a message, refer to the embodiment corresponding to FIG. 11. The foregoing message may include at least one of: the security policy, a network ID, and a UE ID.

It should be noted that the foregoing embodiments are illustrated mainly by using examples in which a KMS or an SM performs key derivation. In addition, a protection key may be obtained by UE, an AN, an MM, an AU, a KMS, an AAA, an SM, or a policy control network element through derivation.

For a process in which the MM generates a protection key through derivation, refer to the process in which the SM generates a protection key through derivation in the foregoing embodiments.

The policy control network element may perform key derivation by using a procedure that is the same as the foregoing procedure of the KMS, to be specific, perform key derivation after receiving a key request. Alternatively, the policy control network element may perform security key derivation immediately after determining a security policy. A procedure is shown in FIG. 15.

Figure 15:
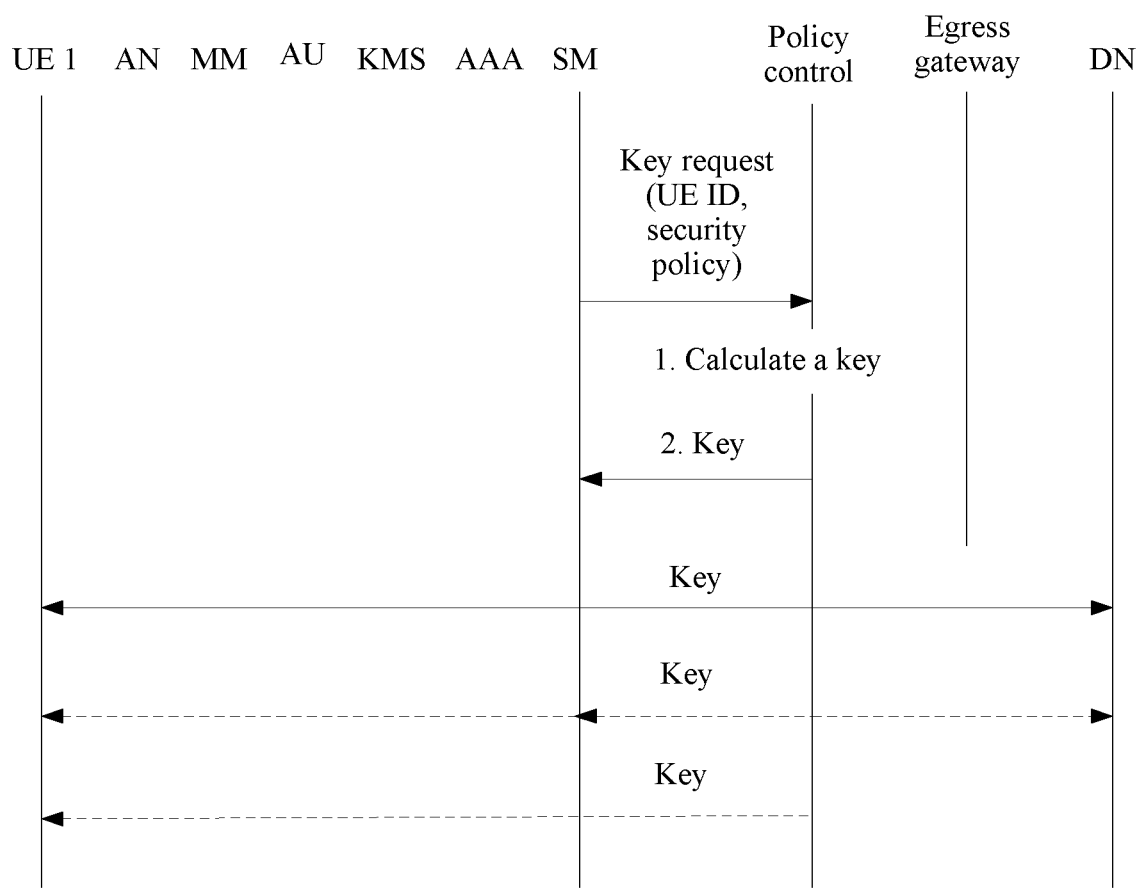
FIG. 15 is a flowchart of another key configuration method according to an embodiment of this application.

FIG. 15 shows a process in which the policy control network element generates a protection key through derivation. The process includes the following steps.

1. The policy control network element generates a key through derivation after determining a security policy or receiving a security policy from an SM. Specifically, the policy control network element may directly calculate at least one of: $K_{SID}$, $K_{SID\_enc}$, and $K_{SID\_int}$, or may first calculate $K_{SID}$ and then calculates at least one of: $K_{SID\_enc}$ and $K_{SID\_int}$ based on the $K_{SID}$. The policy control network element may receive a shared key from another network element (a KMS, an AU, an SM, an MM, or an AAA) after a terminal performs authentication, or initiate a key request, where the request protects the UE ID, to obtain a shared key.

For a specific manner of generating the key through derivation, refer to the foregoing embodiments.

2. The policy control network element sends the generated key (and probably the security policy) to the SM, and then the SM sends the key to two ends of end-to-end communication.

Alternatively, the policy control network element sends the generated key (and probably the security policy) to the UE by using the SM, and then directly sends the generated key to the other end of the end-to-end communication.

Alternatively, the policy control network element directly sends a protection key (and probably the security policy) to the UE.

Alternatively, the policy control network element sends the $K_{SID}$ to the SM, and then the SM performs derivation and sends the $K_{SID\_enc}$ and the $K_{SID\_int}$ to the two ends.

When the UE generates a protection key through derivation, the UE receives the security policy from the SM (or the policy control or the KMS), and calculates the protection key based on the security policy in a manner the same as that in the foregoing embodiments. If the UE needs to use a random parameter when calculating the protection key, the random parameter may be sent by the KMS to the UE, or may be generated by the UE. Alternatively, at least one of: two nonces may be included in key derivation. One nonce is from the KMS (selected by the KMS and directly sent to the UE, or sent by the SM to the UE), and the other nonce is from the UE (added to a session request by the UE).

Alternatively, the UE receives at least one of: the protection key $K_{SID}$, the encryption protection key $K_{SID\_enc}$, and the integrity protection key $K_{SID\_int}$ from the SM (or the policy control or the KMS), or after receiving the $K_{SID}$, the UE obtains the $K_{SID\_enc}$ and the $K_{SID\_int}$ through calculation based on the $K_{SID}$.

The foregoing parameters such as the bearer ID, the flow ID, the slice ID, and the session ID used by the UE in the derivation may exist in the UE, or be sent by the network element (the KMS, the MM, the SM, the policy control, the AU, the gateway, the AAA, or the like) to the UE, for example, be sent to the UE by using a session response message.

Considering that the foregoing security policy includes only a security requirement indicating whether integrity protection is required, whether encryption is required, or whether integrity protection and encryption are required, after the SMF obtains the security policy (may be obtained from a PCF or be obtained by an SMF through negotiation), there are the following three possibilities for subsequent processing:

Possibility 1: After obtaining the security policy, the SMF determines a security algorithm (including an encryption algorithm, or an integrity protection algorithm, or both an encryption algorithm and an integrity protection algorithm) based on a security capability of UE and a UPF algorithm priority that is stored on the SMF, and then generates a security key (including an encryption key, or an integrity protection key, or both an encryption key and an integrity protection key) and sends the determined security algorithm and the generated key to a UPF. In addition, the SMF may also send the determined security algorithm to the UE, so that the UE generates a security key corresponding to the security algorithm. The SMF may also send the security policy to the UE.

Possibility 2: The SMF calculates a key K_SID and sends the security policy and the K_SID to a UPF. Likewise, the UPF may also receive a security capability of UE by using the SMF. The UPF determines a security algorithm (including an encryption algorithm, or an integrity protection algorithm, or both an encryption algorithm and an integrity protection algorithm) based on a security capability of UE and an algorithm priority, and then generates a security key (including an encryption key, or an integrity protection key, or both an encryption key and an integrity protection key). The UPF sends the security algorithm to the SMF, and the SMF sends the security algorithm to the UE, so that the UE generates a security key corresponding to the security algorithm. Alternatively, the UPF may directly send the security algorithm to the UE, so that the UE generates a security key corresponding to the security algorithm.

Possibility 3: After obtaining the security policy, the SMF sends the security policy to an AN, so that the AN determines a security protection algorithm between UE and the AN based on the security policy, a security capability of the UE, and an algorithm priority list of the AN, and then the AN sends the security protection algorithm to the UE, so that the UE generates a security key corresponding to the security algorithm.

As described above, the foregoing shows security policy negotiation and distribution procedures for data protection between the UE and the UPF. Security policy negotiation and distribution procedures for data protection between the UE and the AN is similar to those between the UE and the UPF, and a difference is as follows: A security capability of the AN or the algorithm priority list of the AN needs to be considered in determining of the security policy. In addition, the security policy may be the determined security algorithm, or may be whether integrity protection is required, or whether encryption is required, or whether both encryption and integrity protection are required.

As described above, the finally determined security policy may be a priority list of a security algorithm, including a priority list of an encryption algorithm, or a priority list of an integrity protection algorithm, or a priority list of encryption and integrity protection algorithms. Then, the UPF may determine a security protection algorithm of the UPF based on the security capability of the UE, the priority list of the security algorithm, and a security capability of the UPF. Other subsequent procedures are the same as the procedures in the foregoing embodiments.

As described above, the finally determined security policy may be a priority list of a security algorithm, including a priority list of an encryption algorithm, or a priority list of an integrity protection algorithm, or a priority list of encryption and integrity protection algorithms. Then, the AN may determine a security protection algorithm of the AN based on the security capability of the UE, the priority list of the security algorithm, and the security capability of the AN. Other subsequent procedures are the same as the procedures in the foregoing embodiments.

As described above, the foregoing drawings are described merely by using end-to-end session protection as an example. It should be emphasized that for end-to-end protection of a bearer, a flow, or a slice, a procedure is similar to that in the foregoing drawings, but session parameters in the foregoing drawings need to be replaced with corresponding parameters. Specifically, the session ID is correspondingly replaced with a bearer ID, a flow ID, or a slice ID, and the user plane setup message is correspondingly replaced with a bearer setup message, a flow flow setup message, or a slice setup message.

There is no particular sequence between a key negotiation procedure and a security policy negotiation procedure. For example, a key $K_{SID}$ may be generated before, during, or after session (bearer, flow, or slice) setup. An encryption and/or integrity protection key may be generated at any point-in-time after the KSID is generated.

All the procedures shown in FIG. 4, FIG. 5, and FIG. 7 are a security policy determining process or a key configuration process when the UE 1 sends a session request, a bearer request, a flow request, or a slice request to the carrier network and the carrier network accepts the request. It should be noted that if the carrier network rejects the session request, the bearer request, the flow request, or the slice request of the UE 1, the carrier network sends a rejection message to the UE 1.

In the procedures shown in FIG. 2 to FIG. 9, the used security requirements are based on a case in which a termination point of security protection is a user plane node (User plane function, UPF). However, the termination point of security protection may alternatively be a branching point branching point or a ULCL.

The termination point of security protection may be determined by a mobility management (Mobility Management, MM) network element, a session management (Session Management, SM) network element, an authentication service controller (Authentication Server Function, AUSF), a security anchor function (Security Anchor Function, SEAF) network element, a mobility management entity (Mobility Management Entity, MME), a home subscriber server (Home Subscriber Server, HSS), an authentication center (Authentication Center, AuC), an authentication credential repository and processing function (Authentication Credential Repository and Processing Function, ARPF) network element, a security context management (Security Context Management Function (SCMF) network element, an access and mobility management function (Access and Mobility management Function, AMF) network element, an access node (Access network, AN), a user plane node (User plane function, UPF), an authentication unit in a network (English: Control Plane-Authentication Unit, CP-AU for short), or a security policy determining module.

The following provides illustrations merely by using an example in which the security policy determining module determines the termination point of security protection.

In the procedures shown in FIG. 2 to FIG. 9, after the UE 1 sends an attachment request, or after two-way authentication succeeds, or in a process in which the UE 1 sets up a session (before the UE 1 sends a session request, or after the UE 1 sends a session request), the security policy determining module may further perform the following steps: determining the termination point of security protection; and if the termination point of security protection is the UPF, performing a step after the two-way authentication or after the UE 1 sends the session request in the procedures shown in FIG. 2 to FIG. 9, or if the termination point of security protection is the AN, replacing the security requirement 3 or the security requirement of the UE 2 (a case of the security requirement 4) in the procedures shown in FIG. 2 to FIG. 9 with a security requirement of the AN. A manner of obtaining the security requirement of the AN may be as follows: Based on the foregoing embodiments, after receiving a request message of the UE 1, the AN sends both the request message of the UE 1 and the security requirement of the AN to a network.

Figure 16:
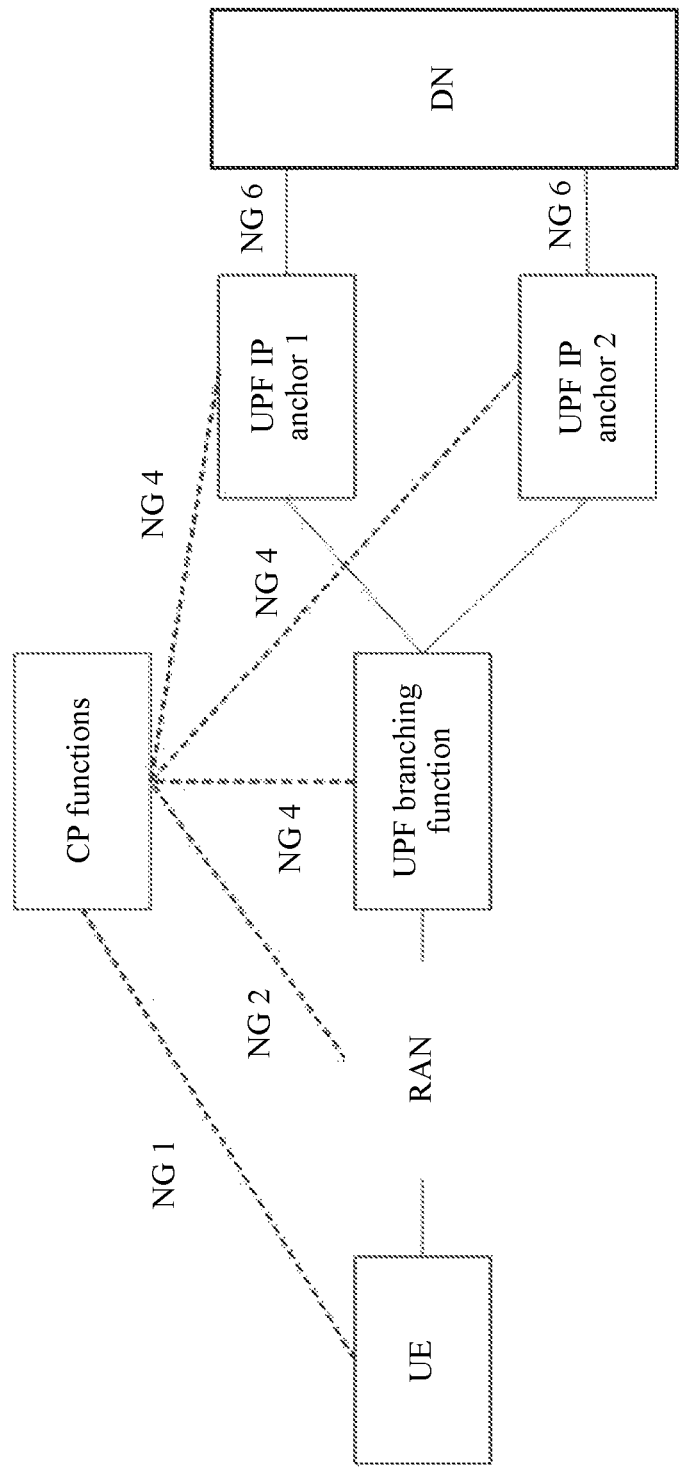
FIG. 16(*a*) and FIG. 16(*b*) are schematic diagrams of a branching scenario.
Figure 16:
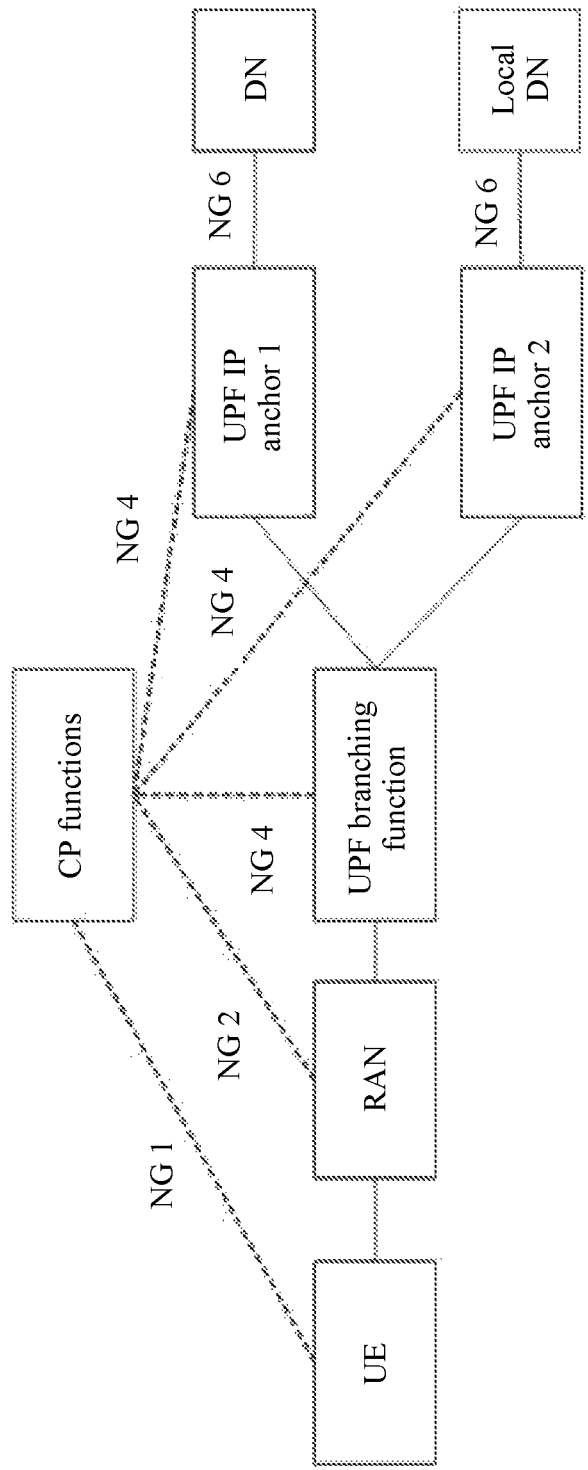

FIG. 16(a) and FIG. 16(b) are branching scenarios. In these scenarios, the security policy determining module needs to determine whether the termination point of security protection is a branching point or a UPF. If the termination point of security protection is the UPF, a step after the two-way authentication or after the UE 1 sends the session request in the procedures shown in FIG. 2 to FIG. 9 is performed. If the termination point of security protection is the branching point, the security requirement 3 or the security requirement of the UE 2 (a case of the security requirement 4) in the procedures shown in FIG. 2 to FIG. 9 is replaced with a security requirement of the branching point.

Figure 17:
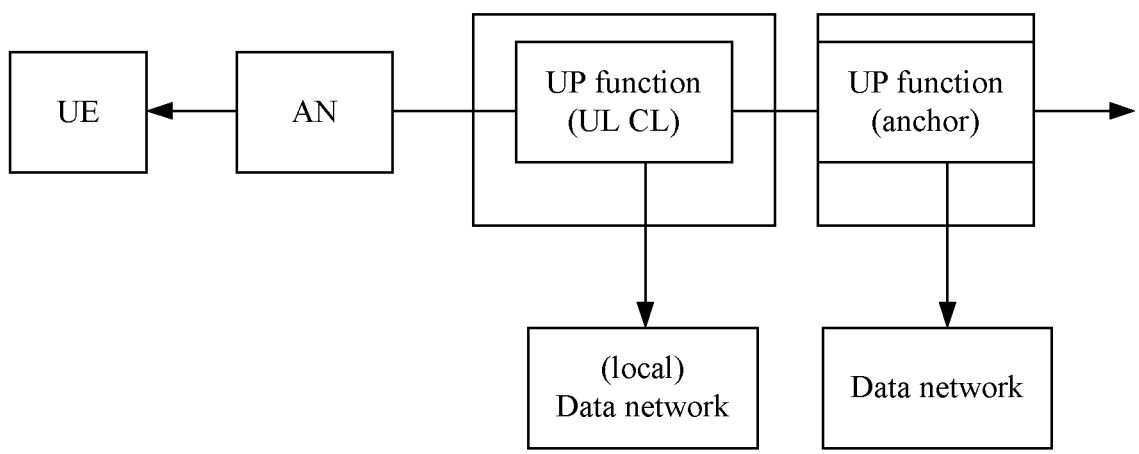
FIG. 17 is a schematic diagram of a scenario in which a session link is UE-AN-UPF (ULCL)-UPF (anchor)

FIG. 17 shows a scenario in which a session link is UE-AN-UPF (uplink data classifier function, uplink classifier functionality, ULCL)-UPF (anchor). In this scenario, the security policy determining module needs to determine whether the termination point of security protection is a UPF (ULCL) or a UPF (anchor). If the termination point of security protection is the UPF (anchor), a step after the two-way authentication or after the UE 1 sends the session request in the procedures shown in FIG. 2 to FIG. 9 is performed. If the termination point of security protection is the ULCL, the security requirement 3 or the security requirement of the UE 2 (a case of the security requirement 4) in the procedures shown in FIG. 2 to FIG. 9 is replaced with a security requirement of the ULCL.

Figure 18:
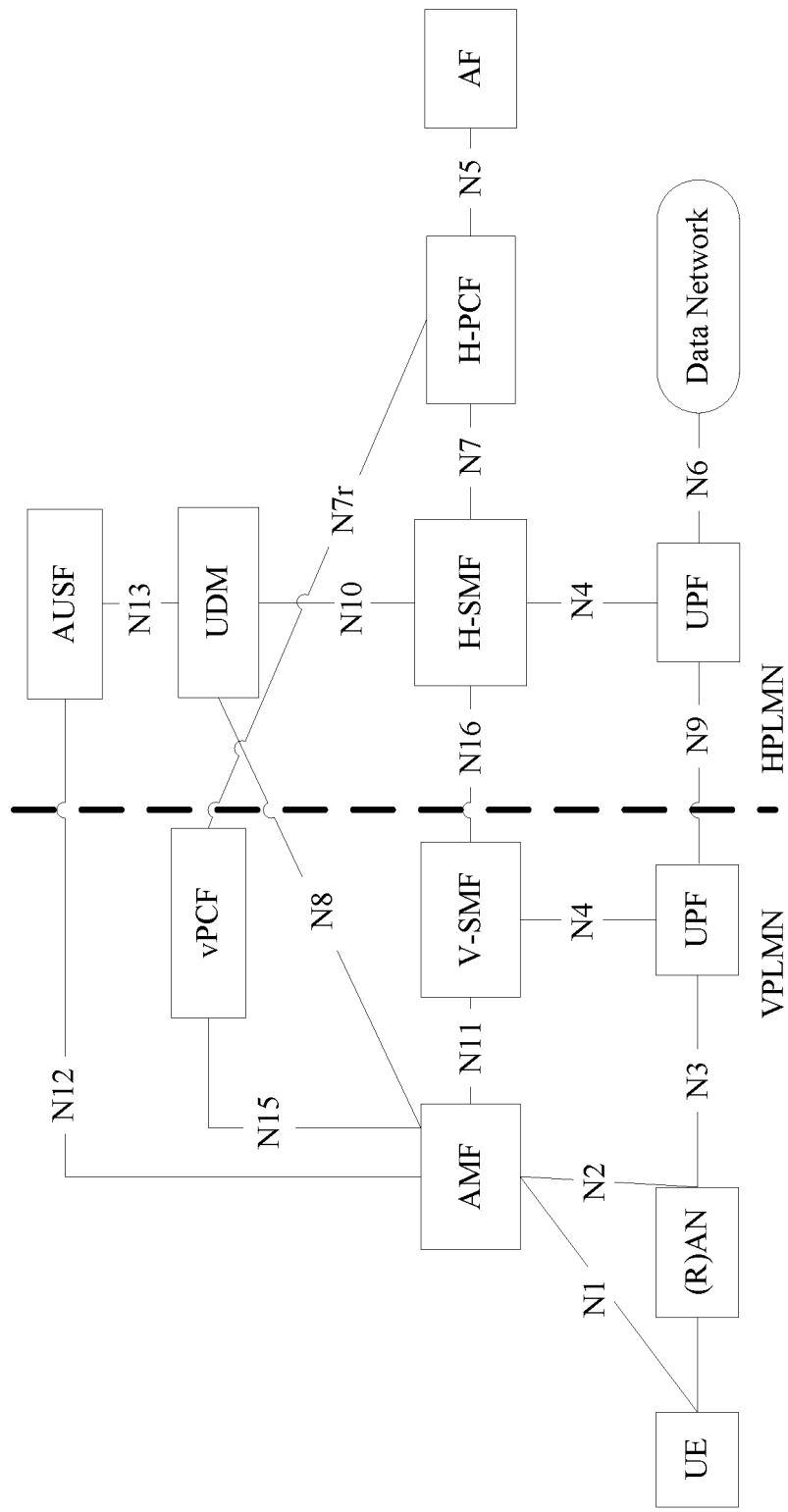
FIG. 18 is a schematic diagram of a home-routed roaming scenario.

In a home-routed roaming scenario shown in FIG. 18, a user plane path is UE-AN-UPF (VPLMN)-UPF (HPLMN). In this case, a termination point of end-to-end security protection may be a UPF (visited public land mobile communications network, visited public land mobile network, VPLMN) or a UPF (home public land mobile communications network, home public land mobile network, HPLMN). In this scenario, in the security policy determining, whether the termination point of security protection is the UPF (VPLMN) or the UPF (HPLMN) needs to be determined. If the termination point of security protection is the UPF (VPLMN), the security requirement 3 is a security requirement of a gateway in the VPLMN. If the termination point of security protection is the UPF (HPLMN), the security requirement 3 is a security requirement of a gateway in the HPLMN.

The security policy determining module may determine, based on configuration information or a node policy of the UE 1 that is received from another function network element such as the HSS, the AUSF, the ARPF, the AMF, the SEAF, the SCMF, the SM, or the AuC, or based on configuration information or a node policy of the UE or the session (or the flow, the bearer, or the slice) that is obtained from a local storage, and based on configuration information of the UE or the session (or the flow, the bearer, or the slice), whether the termination point of security protection is the AN, the branching point, the ULCL, or the UPF. The node policy may be a node policy of each UE, may be a node policy for this type of service, may be a node policy for this type of slice, or may be a node policy for this type of data. In addition, alternatively, the security policy determining module may determine the termination point of security protection based on a service security requirement, a server-side security requirement, a service type, a slice type, or a slicing policy.

All the foregoing examples are a security policy negotiation process and a session data protection key generation and distribution process that are performed on a per session basis. It should be noted that the foregoing method is also applicable to security policy negotiation and slice data protection key generation and distribution that are performed on a per slice basis. A specific implementation is similar to that performed on a per session basis. Differences are as follows: A session ID is a slice ID, a protection key of the UE in the slice is determined, and a protection node may be a function network element in the slice, for example, a UPF.

A slice security policy determining module may be disposed on a mobility management (Mobility Management, MM) network element, a session management (Session Management, SM) network element, an authentication service controller (Authentication Server Function, AUSF), a security anchor function (Security Anchor Function, SEAF) network element, a mobility management entity (Mobility Management Entity, MME), a home subscriber server (Home Subscriber Server, HSS), an authentication center (Authentication Center, AuC), an authentication credential repository and processing function (Authentication Credential Repository and Processing Function, ARPF) network element, a security context management (Security Context Management Function, SCMF) network element, an access and mobility management function (Access and Mobility management Function, AMF) network element, an AN node, a UPF node, an authentication unit in a network (Control Plane-Authentication Unit, CP-AU), or the security policy determining module.

Specific security policy determining procedures may be classified into the following three cases:

Before session setup, and after authentication is complete, the slice security policy determining module (for example, may be equivalent to the foregoing security policy determining module) determines a slice security policy in a manner the same as that in the foregoing embodiments, to be specific, based on at least one of: a security capability of the UE 1, a service security requirement, a security capability of a function network element in a slice, a security capability of the UE 1 preset in the network, and a security requirement on an application server side. The security capability of the function network element in the slice may be obtained from the HSS, the AUSF, the ARPF, the AMF, the SEAF, the SCMF, the SM, the AuC, or the like.

During session setup, a slice security policy is determined in a manner similar to that used above.

After session setup, a slice security policy is determined after session setup. Security policy negotiation and key negotiation are not included in a session setup process.

After determining the slice security policy, the security policy determining module sends the slice security policy to the UE. A key distribution procedure is similar to that in a session procedure. Finally, the UE and the function network element in the slice obtain the security protection key and the security protection policy.

In the key configuration procedure in this embodiment of this application, a session protection key may be configured for the UE and the gateway (or the DN server or the UE 2). In this way, end-to-end session protection is implemented based on a 5G mobile communication architecture. Higher security is implemented as compared with an existing segment-based encryption manner.

In addition, a security policy may be determined based on security requirements of the UE, the carrier network, and the data network. Therefore, the session protection key may be determined based on security requirements of different parties. This can implement differentiated security protection as compared with the prior art in which all service data is encrypted by using a same protection key on a base station side.

Figure 19:
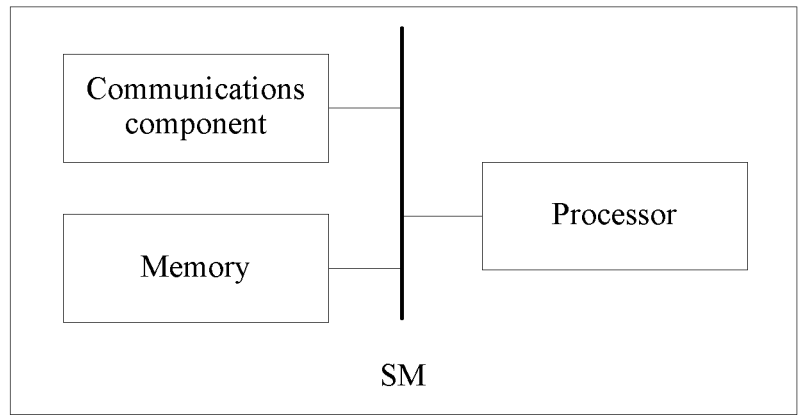
FIG. 19 is a schematic structural diagram of a session management network element according to an embodiment of this application.

FIG. 19 shows an SM network element according to an embodiment of this application. The SM network element includes a communications component and a processor, and may further include a memory. The communications component is configured to receive a request for end-to-end communication. The processor is configured to obtain a security policy. The communications component is further configured to: send the security policy and/or the protection key to the user equipment; and send the security policy and/or the protection key to a device on the other end of the end-to-end communication. For specific implementations of functions of the communications component and the processor, refer to FIG. 2 to FIG. 15. Details are not described herein again.

An embodiment of this application further discloses a KMS, an MM, an HSS, and a policy control network element. For specific implementations of functions of a communications component and a processor that are included in a specific structure, refer to FIG. 2 to FIG. 15. Details are not described herein again.

Figure 20:
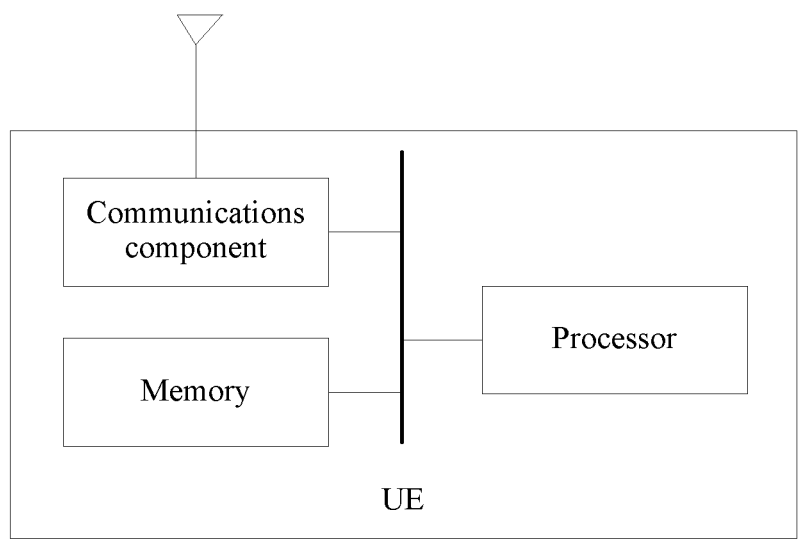
FIG. 20 is a schematic structural diagram of user equipment according to an embodiment of this application.

FIG. 20 is user equipment according to an embodiment of this application. The user equipment includes a communications component and a processor. The communications component and the processor may communicate with each other by using a bus.

The communications component is configured to send a request and receive a response. The request includes an identity of the user equipment. The response carries a security policy.

The processor is configured to obtain a protection key, where the protection key is used to protect the end-to-end communication, and the protection key is determined based on the security policy and a shared key between the user equipment and the carrier network.

For specific implementations of functions of the communications component and the processor, refer to FIG. 2 to FIG. 15. Details are not described herein again.

The foregoing devices may determine a security policy and generate an end-to-end protection key through mutual collaboration. In this way, end-to-end session protection is implemented based on a 5G mobile communication architecture.

The embodiments in the specification are all described in a progressive manner. Each embodiment focuses on a difference from other embodiments. For same or similar parts in the embodiments, refer to these embodiments.

What is claimed is:

1. A method for determining a security policy, comprising:
    receiving, by a session management network device, a session request from a mobile management network device;
    determining, by the session management network device, a target security requirement based on a terminal device security requirement of a terminal device and an operator network security requirement of an operator network, the terminal device security requirement is obtained from a subscriber repository and the operator network security requirement is stored in the session management network device;
    the determining the target security requirement based on the terminal device security requirement and the operator network security requirement comprising:
    determining the target security requirement based on the terminal device security requirement when a terminal device security requirement priority of the terminal device is higher than an operator network security requirement priority of the operator network;
    determining, by the session management network device, a security policy based on the target security requirement, the security policy indicating whether integrity protection is required; and
    sending, by the session management network device, the security policy to a base station.

2. The method according to claim 1, wherein the target security requirement is configured to indicate whether encryption is required.

3. The method according to claim 2, wherein the security policy is configured to indicate whether encryption is required.

4. The method according to claim 3, wherein the target security requirement comprises a key length of a key and the security policy comprises the key length of the key.

5. The method according to claim 4, wherein the target security requirement comprises an update time of the key and the security policy comprises the update time of the key.

6. The method according to claim 5, further comprising:
    sending, by the session management network device, the security policy to a user equipment.

7. A session management network device, the session management network device comprising:
- a communications device configured to receive a session request from a mobility management network device;
- a hardware processor in communication with the communications device, the hardware processor configured to:
  - determine a target security requirement based on a terminal device security requirement of a terminal device and an operator network security requirement of an operator network, the terminal device security requirement is obtained from a subscriber repository and the operator network security requirement is stored in the session management network device;
  - the determining the target security requirement based on the terminal device security requirement and the operator network security requirement comprising:
    - determine the target security requirement based on a security requirement of the terminal device when a terminal device security requirement priority of the terminal device is higher than an operator network security requirement priority of the operator network;
  - determine a security policy based on the target security requirement, the security policy indicating whether integrity protection is required; and
- the communications device configured to send the security policy to a base station.

8. The session management network device according to claim 7, wherein the target security requirement is configured to indicate whether encryption is required.

9. The session management network device according to claim 8, wherein the security policy is further configured to indicate whether encryption is required.

10. The session management network device according to claim 9, wherein the target security requirement comprises a key length of a key and the security policy further comprises the key length of the key.

11. The session management network device according to claim 10, wherein the target security requirement comprises an update time of the key and the security policy further comprises the update time of the key.

12. The session management network device according to claim 11, wherein the communications device is configured to send the security policy to a user equipment.

13. A method for determining a security policy, comprising:
- sending, by a mobility management network device, a session request to a session management network device;
- receiving, by the session management network device, the session request from the mobility management network device;
- determining, by the session management network device, a target security requirement based on a security requirement of a terminal device and a security requirement of an operator network, the security requirement of the terminal device is obtained from a subscriber repository and the security requirement of the operator network is stored in the session management network device;
- the determining the target security requirement based on a security requirement of a terminal device and a security requirement of an operator network comprising:
  - determining the target security requirement based on a security requirement of the terminal device when the priority of the security requirement of the terminal device is higher than the priority of the security requirement of the operator network;
- determining, by the session management network device, a security policy based on the target security requirement, the security policy indicating whether integrity protection is required; and
- sending, by the session management network device, the security policy to a base station.

14. The method according to claim 13, wherein the target security requirement is configured to indicate whether encryption is required.

15. The method according to claim 14, wherein the security policy is configured to indicate whether encryption is required.

16. The method according to claim 15, wherein the target security requirement further comprises a key length of a key and the security policy further comprises the key length of the key.

17. A system for determining a security policy, comprising:
- a mobility management network device; and
- a session management network device in communication with the mobility management network device;
- the mobility management network device configured to:
  - send a session request to the session management network terminal device;
- the session management network device is configured to:
  - receive the session request from the mobility management network device;
  - determine a target security requirement based on a terminal device security requirement of a terminal device and an operator network security requirement of an operator network, the security requirement of the terminal device is obtained from a subscriber repository and the security requirement of the operator network is stored in the session management network device;
  - the determining the target security requirement based on the terminal device security requirement and the operator network security requirement comprising:
    - determine the target security requirement based on the terminal device security requirement when a terminal device security requirement priority of the terminal device is higher than an operator network security requirement priority of the operator network;
  - determine a security policy based on the target security requirement, the security policy indicating whether integrity protection is required; and
  - send the target security policy to a base station.

18. The system according to claim 17, wherein the target security requirement is configured to indicate whether encryption is required.

19. The system according to claim 18, wherein the security policy is configured to indicate whether encryption is required.

20. The system according to claim 19, wherein the target security requirement comprises a key length of a key and the security policy further comprises the key length of the key.

* * * * *